United States Patent
Rajagopalan et al.

(10) Patent No.: US 10,210,426 B2
(45) Date of Patent: Feb. 19, 2019

(54) POSITION ESTIMATION OF LIGHT SOURCE OF A LUMINAIRE FROM LIGHT FOOTPRINT

(71) Applicant: PHILIPS LIGHTING HOLDING B.V., Eindhoven (NL)

(72) Inventors: Ruben Rajagopalan, Neuss (DE); Harry Broers, S-Hertogenbosch (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 225 days.

(21) Appl. No.: 15/121,787

(22) PCT Filed: Jan. 28, 2015

(86) PCT No.: PCT/EP2015/051637
§ 371 (c)(1),
(2) Date: Aug. 26, 2016

(87) PCT Pub. No.: WO2015/128143
PCT Pub. Date: Sep. 3, 2015

(65) Prior Publication Data
US 2017/0011522 A1    Jan. 12, 2017

(30) Foreign Application Priority Data

Feb. 26, 2014 (EP) ..................................... 14156865

(51) Int. Cl.
*G06T 9/00*        (2006.01)
*G06K 9/62*        (2006.01)
(Continued)

(52) U.S. Cl.
CPC .......... *G06K 9/6202* (2013.01); *G01B 11/002* (2013.01); *G06K 9/4661* (2013.01); *G06T 7/74* (2017.01)

(58) Field of Classification Search
CPC .. G01B 11/002; G06K 9/4661; G06K 9/6202; G06T 7/74; G06T 7/0044; G01S 17/06; G01S 17/46
See application file for complete search history.

(56) References Cited

U.S. PATENT DOCUMENTS

| 4,660,970 A | 4/1987 | Ferrano |
| 5,038,261 A | 8/1991 | Kloos |

(Continued)

FOREIGN PATENT DOCUMENTS

| CN | 203216699 U | 9/2013 |
| EP | 0762092 A2 | 12/1997 |

(Continued)

*Primary Examiner* — Yon J Couso
(74) *Attorney, Agent, or Firm* — Meenakshy Chakravorty

(57) ABSTRACT

The invention relates to a method for determining an unknown position, i.e. height and/or orientation, of a light source within a locality. The determination is based on a first image of a scene within the locality acquired by a camera in such a manner as to contain a light footprint of light emitted by the light source from the unknown position. The method includes steps of processing the first image to determine one or more characteristics of the at least the portion of the light footprint within the first image, comparing the determined characteristics with one or more corresponding known characteristics of a light footprint of light emitted by the light source from a known position to determine a deviation between the determined and the known characteristics, and determining the unknown position of the light source based on the determined deviation.

15 Claims, 13 Drawing Sheets

(51) Int. Cl.
    *G01B 11/00*     (2006.01)
    *G06K 9/46*     (2006.01)
    *G06T 7/73*     (2017.01)

(56) References Cited

U.S. PATENT DOCUMENTS

| | | | |
|---|---|---|---|
| 2009/0177426 A1* | 7/2009 | Dodds | G01J 1/08 |
| | | | 702/85 |
| 2013/0138246 A1* | 5/2013 | Gutmann | G05D 1/0231 |
| | | | 700/253 |
| 2014/0285818 A1* | 9/2014 | Holz | G01S 17/42 |
| | | | 356/614 |
| 2016/0154088 A1* | 6/2016 | Holtman | G01S 5/16 |
| | | | 382/106 |

FOREIGN PATENT DOCUMENTS

| | | |
|---|---|---|
| EP | 2592329 A1 | 5/2013 |
| WO | 2011037993 A2 | 3/2011 |
| WO | 2013111134 A1 | 8/2013 |

* cited by examiner

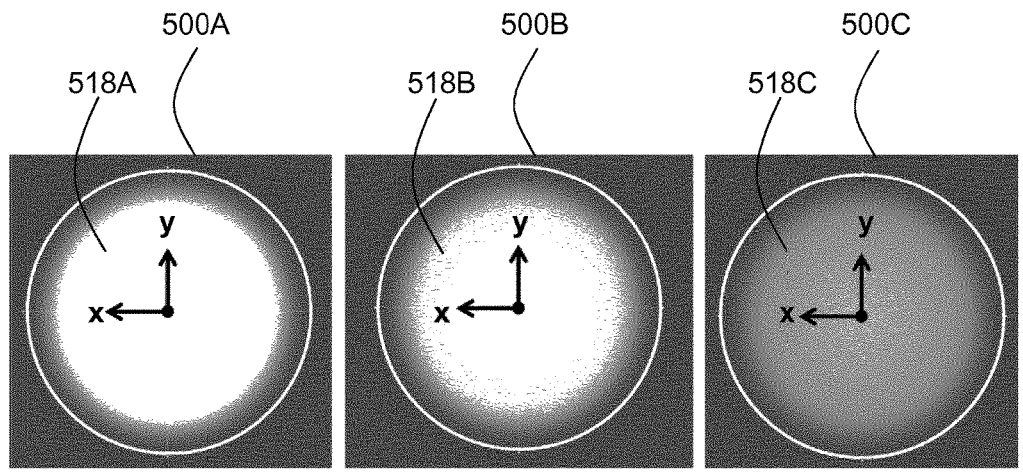
FIG. 5A  FIG. 5B  FIG. 5C
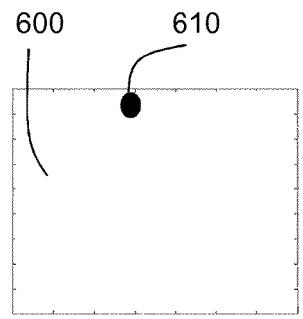
FIG. 6

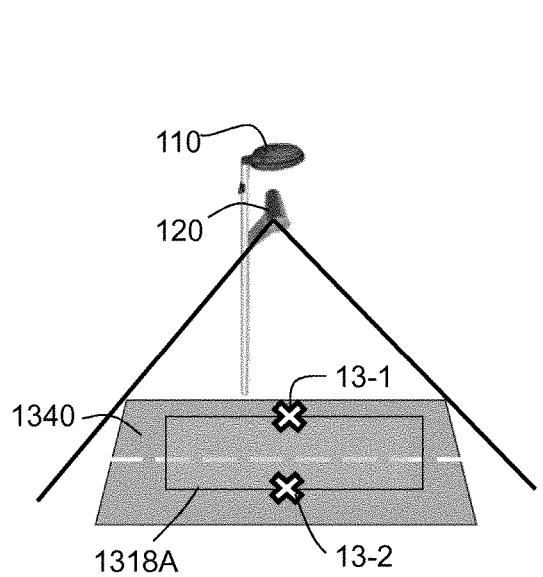 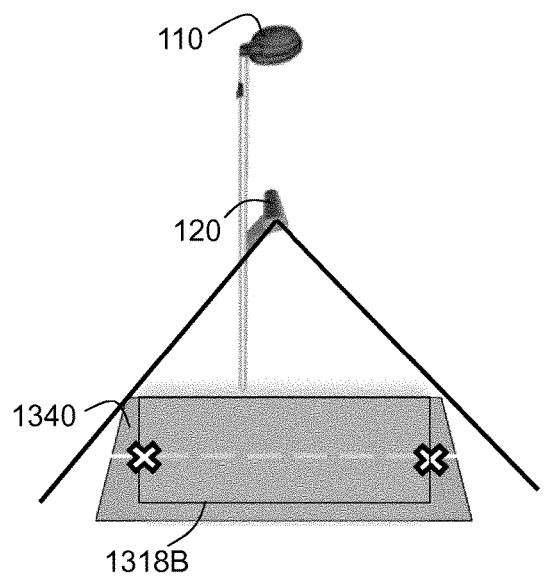
FIG. 13A　　　　FIG. 13B

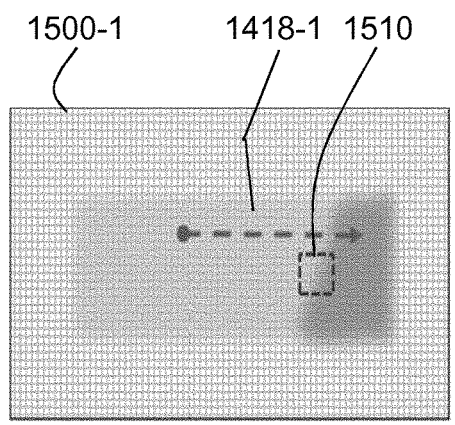
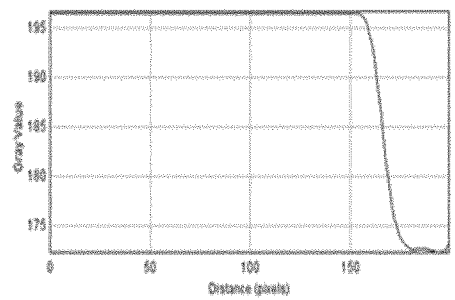
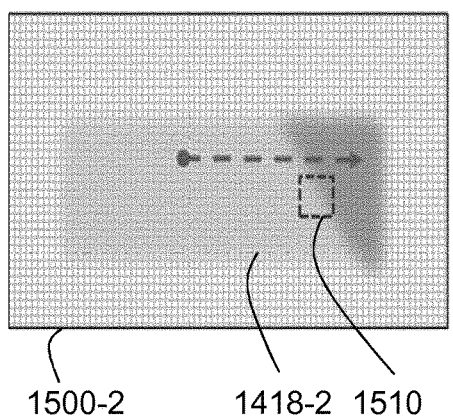
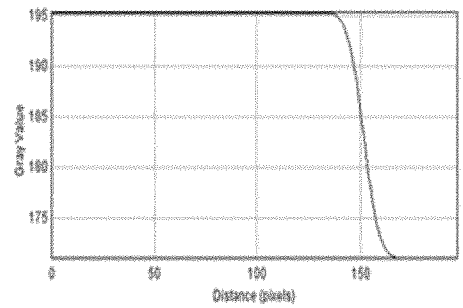
FIG. 15A  FIG. 15B

POSITION ESTIMATION OF LIGHT SOURCE OF A LUMINAIRE FROM LIGHT FOOTPRINT

CROSS-REFERENCE TO PRIOR APPLICATIONS

This application is the U.S. National Phase application under 35 U.S.C. § 371 of International Application No. PCT/EP2015/051637, filed on Jan. 28, 2015, which claims the benefit of European Patent Application No. 14156865.9, filed on Feb. 26, 2014. These applications are hereby incorporated by reference herein.

BACKGROUND OF THE INVENTION

Field of the Invention

Embodiments of the present invention relate generally to the field of illumination systems, and, more specifically, to systems and methods for determining unknown positions of light sources within such illumination systems.

Description of the Related Art

Outdoor lighting applications place high significance on the information regarding the position, i.e. the height and the orientation in space, of luminaires with respect to the road surface. This information is used at various stages throughout the operating life of a lighting network. At the time of the installation, installers require precise position information to ensure that the installed lighting has the optimal illumination and safety considerations. During remote commissioning, calibration and post-installation phases, position information is very useful for taking necessary corrective and compensation actions.

Currently, the position information is determined manually, where an installer walks around luminaires with clinometers and inclinometers and measures the desired values. Such an approach is time-consuming, costly, and error-prone.

What is needed in the art is a technique that enables determination of unknown positions of light sources of luminaires in a manner that improves on at least some of the problems described above.

SUMMARY OF THE INVENTION

According to one aspect of the present invention, a computer-implemented method for determining an unknown position, i.e. unknown mounting height and/or orientation (the orientation comprising rotation around one or more axes of rotation), of a light source within a locality is disclosed. The determination is based on a first image of a scene within the locality that has been acquired by an optical sensor such as e.g. a camera or a photo-cell. The first image is acquired in such a manner as to contain at least a portion of a light footprint of light emitted by the light source from the unknown position. The method includes steps of processing the first image to determine one or more characteristics of the at least the portion of the light footprint within the first image, comparing the determined characteristics with one or more corresponding known (e.g. calculated, expected, predicted, statistical, etc.) characteristics of a light footprint of light emitted by the light source from a known position to determine a deviation between the determined and the known characteristics, and determining the unknown position of the light source based on the determined deviation. Knowing the mounting position of a light source provides advantages in terms of e.g. enabling optimization of the light intensity of the light source to match the prescribed light levels or detecting incorrect mounting positions.

Embodiments of the present invention are based on several recognitions. First of all, the inventors recognized that the increasing need for having automated solutions in lighting installations for smart light monitoring and control can extend to the determination of luminaire/light source positions. Further, the inventors recognized that, as the typical illumination profiles or patterns of light sources are standardized, normally in the design phase at the factory, integrated or add-on optical sensors can be used to estimate a position of the luminaire by matching carefully selected characteristics of its light footprint profile against those characteristics of the expected, known, profiles. In this manner, an automated and integrated solution for determining positions of luminaires may be provided, thereby reducing the time spent, cost, and errors associated with obtaining position information, as compared with the manual techniques. In addition, since the position information is immediately obtained in the electronic form, as opposed to e.g. an installer manually making the measurements and then having to enter the measured results into a computer, dissemination of this information to parties which may be interested is made easier, quicker, and more reliable. For example, if a luminaire comprises a light source capable of transmitting data by encoding the data into its light output as e.g. a series of modulations in amplitude or phase of the light signal, a technique sometimes referred to as "coded light", then such a luminaire could transmit its determined position information to other parties, e.g. a central controller of the lighting network. In this manner, embodiments of the present invention provide the opportunity to continuously monitor position of a light source, also whenever the light source of a luminaire is replaced by a different prototype, throughout the lighting deployment process.

In one embodiment (scenario 1 described herein), the unknown position of the light source may comprise a mounting height of the light source and the one or more characteristics of the light footprint may comprise a maximum intensity within the light footprint, an intensity at a predetermined position within the light footprint, and/or a sum of intensities at two or more different predetermined positions within the light footprint.

In another embodiment (scenario 2 described herein), the unknown position of the light source may comprise a mounting orientation of the light source, namely, the rotation of the light source about a predetermined single axis of rotation, which axis lies in a plane that is parallel to the light footprint (i.e., in a plane that is parallel to the surface illuminated by the light source), shown in the present figures as the y-axis. The light footprint of light emitted by the light source from the known position for such an embodiment comprises a light footprint of light emitted by the light source from a predetermined mounting rotation of the light source about the predetermined axis of rotation. In this embodiment, the one or more characteristics of the light footprint comprise characteristics indicative of a gradient in intensity distribution in the first image along a so-called "gradient line" in the first image, the gradient line being perpendicular to a line that is a projection of the predetermined axis of rotation onto the light footprint/first image.

In various embodiments, the characteristics indicative of the gradient could comprise e.g. a location along the gradient line, with respect to an optical axis of the camera or an optical axis of the light source, of maximum intensity within the light footprint, an intensity distribution within the light footprint along the gradient line, and/or intensities at two or more different predetermined positions along the gradient line within the light footprint.

In a continuation of the previously-described embodiment, the unknown position of the light source may further comprise a mounting height of the light source. In this case, the method may further comprise steps of processing the first image to determine one or more further characteristics of the light footprint within the first image, comparing the one or more determined further characteristics with one or more known further characteristics of a light footprint of light emitted by the light source from a predetermined mounting height to determine a further deviation between the one or more determined further characteristics and the one or more known further characteristics, and determining the mounting height of the light source based on the determined further deviation. In various embodiments, the one or more further characteristics of the light footprint may comprise a maximum intensity within the light footprint along a line in the first image perpendicular to the gradient line, an intensity at a predetermined position within the light footprint along the line in the first image perpendicular to the gradient line, and/or a sum of intensities at two or more different predetermined positions within the light footprint along the line in the first image perpendicular to the gradient line.

In another embodiment (scenario 3 described herein), the unknown position of the light source comprises both a mounting height and an orientation of the light source, the orientation comprising rotation of the light source about any one or more axes of rotation. In such an embodiment, the light footprint of light emitted by the light source from the known position is a light footprint of light emitted by the light source from a predetermined height and a predetermined mounting rotation and the one or more characteristics of the light footprint comprise intensities at two or more different predetermined positions within the light footprint.

The embodiments described above (i.e., scenarios 1-3) provide the advantage of extracting the light footprint characteristics with very limited requirements concerning the sensing modality and signal processing capabilities in order to derive the mounting height and/or the mounting orientation of the light source.

In yet another embodiment (scenario 4 described herein), the unknown position of the light source comprises a mounting orientation of the light source and the one or more characteristics of the light footprint comprise one or more characteristics indicative of a shape of the light footprint.

In a continuation of the previously-described embodiment, the unknown position of the light source may further comprise a mounting height of the light source. In this case, the method may further comprise steps of processing the first image to determine one or more further characteristics of the light footprint within the first image, comparing the one or more determined further characteristics with one or more known further characteristics of a light footprint of light emitted by the light source from a predetermined mounting height to determine a further deviation between the one or more determined further characteristics and the one or more known further characteristics, and determining the mounting height of the light source based on the determined further deviation. The one or more further characteristics of the light footprint could comprise a maximum intensity within the light footprint, an intensity at a predetermined position within the light footprint, and/or a sum of intensities at two or more different predetermined positions within the light footprint.

In still further embodiment (scenario 5 described herein), the unknown position of the light source comprises a mounting rotation of the light source about a predetermined axis of rotation in a plane parallel to the light footprint of light emitted by the light source. In such an embodiment, triangulation technique is employed where the light footprint of light emitted by the light source from the known position comprises a light footprint of light emitted by the light source from a known mounting rotation of the light source about the predetermined axis of rotation and the one or more characteristics of the light footprint comprise a location, within the light footprint and along a line perpendicular to a line that is a projection of the predetermined axis of rotation onto the light footprint, of at least one extreme point of the light footprint (i.e., the start or the end of the light footprint along that line).

In another embodiment that is also based on triangulation (scenario 6 described herein), the unknown position of the light source comprises a mounting height of the light source. In such an embodiment, the light footprint of light emitted by the light source from the known position is a light footprint of light emitted by the light source from a known height and the one or more characteristics of the light footprint comprise one or two characteristics indicative of an area of the light footprint.

In a third embodiment based on triangulation (scenario 7 described herein), the unknown position of the light source comprises a mounting rotation of the light source about a predetermined axis of rotation in a plane parallel to the light footprint of light emitted by the light source and a mounting height of the light source. In such an embodiment, the light footprint of light emitted by the light source from the known position is a light footprint of light emitted by the light source from a known mounting rotation of the light source about the predetermined axis of rotation and from a known height and the one or more characteristics of the light footprint comprise one or more characteristics indicative of an area of the light footprint as well as one or more characteristics indicative of a location of the light footprint within the first image.

The embodiments described in scenarios 4-7 advantageously allow using such characteristics of light footprints in the acquired images that do not rely on the absolute values of light intensities as recorded within the images, thus eliminating the need to account for variations in surface reflection characteristics in order to derive mounting positions of light sources.

In yet another embodiment (scenario 8 described herein), the unknown position of the light source comprises a mounting rotation of the light source about an axis of rotation perpendicular to the light footprint of light emitted by the light source and the light footprint of light emitted by the light source from the known position comprises a light footprint of light emitted by the light source from a known mounting rotation of the light source about the axis of rotation. In such an embodiment, the one or more characteristics of the light footprint could comprise a location of a predetermined gradient point in intensity distribution along a predetermined line in the light footprint. The predetermined gradient point could be e.g. the point of maximum gradient or the point where the gradient first changes from zero to a non-zero value or the other way around. This embodiment provides the advantage of extracting the light footprint characteristics due to variation in surface reflection characteristics, while having apriori information about the road topology, to derive the orientation of the light source which involves rotation along a single-axis in the most cost-effective and simplest manner. Alternatively, the one or more characteristics of the light footprint in this embodiment could comprise characteristics indicative of a gradient in intensity distribution within a predetermined two-dimensional area within the light footprint. This embodiment advantageously allows obtaining information about the direction of rotation of the light source from its known mounting rotation.

In any of the methods described herein, the light footprint of light emitted by the light source from the known position that is used for comparison with the acquired first image may be selected from a plurality of light footprints of light emitted by the light source from a plurality of known positions, the plurality of known positions being different from one another. The selection is made so that the selected light footprint of light emitted by the light source from the known position has the one or more known characteristics closest in value(s) to the one or more characteristics of the light footprint contained in the first image. In this manner, the unknown position of the light source is estimated based on the closest match, which results in a more accurate estimation.

According to another aspect of the present invention, a device for determining an unknown position of a light source within a locality based on a first image of a scene within the locality, the first image containing a light footprint of light emitted by the light source from the unknown position, is disclosed. The device comprises at least one or more processors as well as means for obtaining the first image and a memory, both communicatively connected to the one or more processors. The memory may store one or more programs configured to be executed by the one or more processors. The one or more programs include instructions for carrying out any of the methods described herein. In various embodiments, the one or more processors may be implemented in hardware, in software, or as a hybrid solution having both hardware and software components.

In an embodiment of such a device, the means for obtaining the first image could comprise an optical sensor, e.g. a camera, configured to acquire the first image. In other embodiments, the means for obtaining the first image could comprise a receiver configured for receiving the first image that have been acquired by an external optical sensor.

The device may also, optionally, comprise means for outputting the determined position of the light source, such means also communicatively connected to the one or more processors. In one embodiment of such a device, the output means could comprise a transmitter configured to transmit the position information to further devices, e.g. via WiFi or via coded light. In other embodiments, the output means could comprise a display for outputting the determined position by displaying the determined position on the display.

In an embodiment, the device described herein could be included within a luminaire comprising the light source the position of which is to be determined. Such a luminaire could also include the optical sensor for acquiring the first image, thus providing an integrated solution for determining the position information of the light source.

Moreover, a computer program (product) for carrying out the methods described herein, as well as a computer readable storage-medium (CRM) storing the computer program are provided. A computer program may, for example, be downloaded (updated) to the existing devices and luminaires to configure them to determine the position information of their light sources, or be stored upon manufacturing of these devices. Preferably, the CRM comprises a non-transitory CRM.

Hereinafter, embodiments of the invention will be described in further detail. It should be appreciated, however, that these embodiments may not be construed as limiting the scope of protection for the present invention.

BRIEF DESCRIPTION OF THE DRAWINGS

FIGS. 5A, 5B, and 5C provide examples of images acquired by an optical sensor when a light source is mounted at various heights, according to one embodiment of the present invention;

FIG. 6 is a schematic illustration of pixel intensity values of a line profile of the light footprint in one of the images shown in FIGS. 5A-5C, according to one embodiment of the present invention;

FIGS. 13A and 13B illustrate determining both unknown mounting height and unknown mounting orientation of a light source when the light source is mounted at different heights and orientations, according to one embodiment of the present invention;

FIG. 15A provides examples of images acquired by an optical sensor when a light source is mounted at various rotations shown in FIG. 14, according to one embodiment of the present invention; and FIG. 15B illustrates respective pixel intensities as seen on the line profile (1D) for the light distribution shapes shown in FIG. 15A, according to one embodiment of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
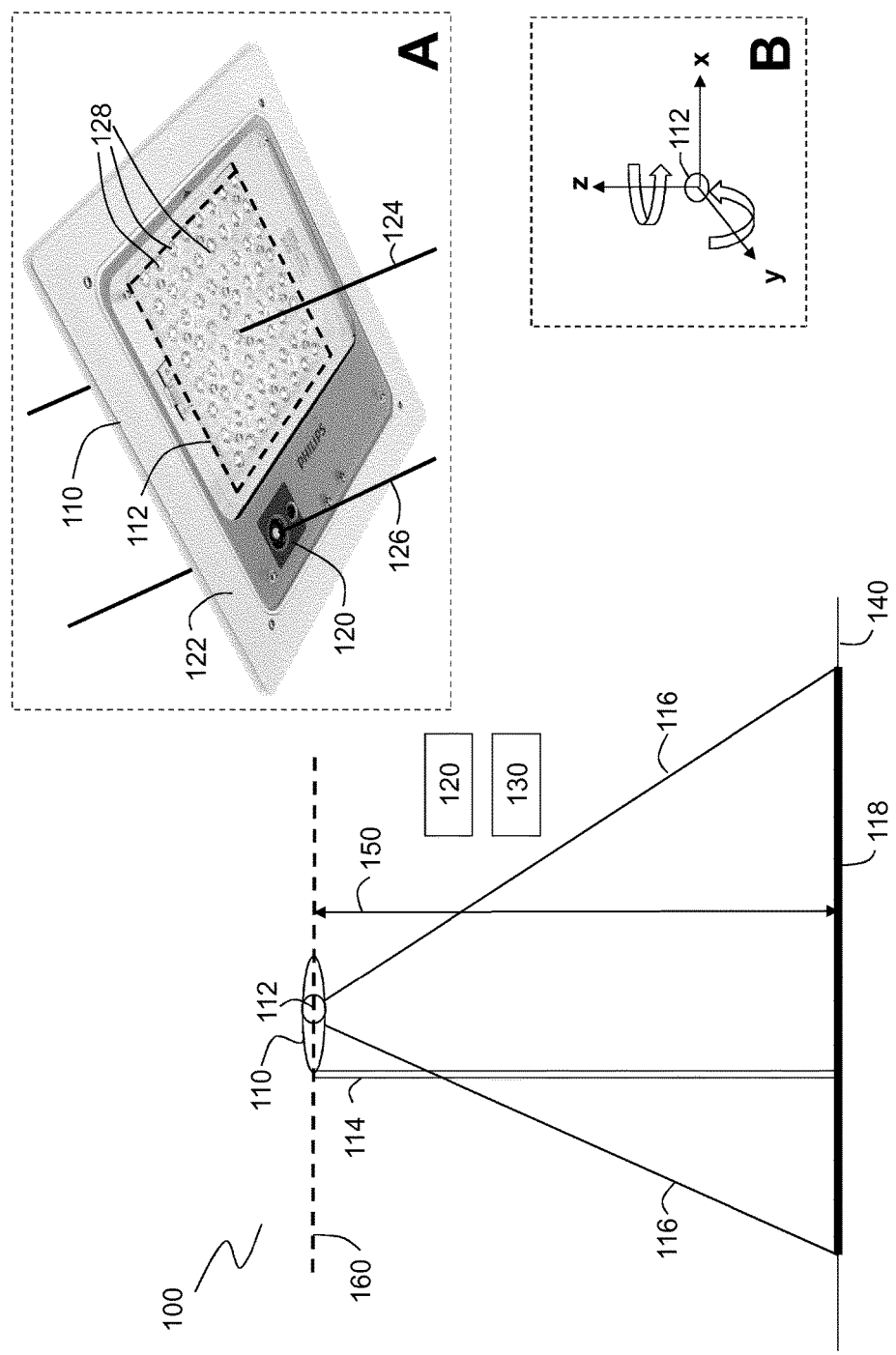
FIG. 1 is a schematic illustration of a lighting system, according to one embodiment of the present invention.

FIG. 1 provides a schematic illustration of a lighting system 100, according to one embodiment of the present invention. The lighting system 100 includes a luminaire 110, the luminaire 110 comprising at least a light source 112 for providing illumination. The light source 112 may comprise any suitable source of light such as e.g. a high/low pressure gas discharge source, a laser diode, an inorganic/organic light emitting diode (LED), an incandescent source, or a halogen source. While in FIG. 1 the light source 112 is shown as a single light source, in general, the light source 112 could comprise multiple light sources, e.g. multiple LEDs which may, for example, form an array of light sources collectively operating as a single light source.

The lighting system 100 further includes an optical (light) sensor 120 and a device 130 for determining the position of the light source 112. The optical sensor 120 and the device 130 are shown in FIG. 1 as stand-alone components to illustrate that, in some embodiments, one or both of these components could be external to the luminaire 110 and included somewhere else within the system 100. For example, the optical sensor 120 and the device 130 could be provided in an additional, preferably single, unit that can be used to retrofit existing luminaires with the position determination methods described herein. In an embodiment, the optical sensor 120 and/or the device 130 could be configured to be attached to the luminaire 110. For example, the optical sensor 120 and/or the device 130 could be configured to be mechanically, physically attached to the housing of the luminaire 110 (i.e., be in physical contact with any part of the luminaire 110). Alternatively, the optical sensor 120 and/or the device 130 do not have to be physically attached or be in any kind of physical contact with the luminaire 110 and could be placed e.g. on the post of (e.g. a post 114 of the luminaire 110 shown in FIG. 1) or near the luminaire 110, e.g. when the luminaire 110 is a street lamp.

In other embodiments, one or both of the optical sensor 120 and the device 130 could be included within the luminaire 110.

The optical sensor 120 could be any component capable of acquiring images containing the light footprint of light emitted by the light source 112. Preferably, the optical sensor 120 could provide an electronic (analog or digital) signal whose magnitude quantifies the detected light level at various pixels within the acquired image. For example, the optical sensor 120 may be configured to, for each pixel, convert detected light into a voltage or current signal proportional to the light intensity at a particular frequency of within a particular spectral range. Examples of suitable optical sensors 130 include cameras, photodiodes, phototransistors, photoresistors, radiometers, photometers, colorimeters, spectral radiometers, or any combination of two or more of these devices.

In operation, the optical sensor 120 is positioned in such a way as to be able to acquire an image containing at least a portion of the light footprint created by the light emitted by the light source 112. To that end, the field of view of the optical sensor 120 at least partially overlaps with the illumination footprint of the light produced by the light source 112. In FIG. 1, the light emitted by the light source 112 is shown as a light cone 116, having a light footprint 118 on a surface 140 illuminated by the light source 112.

In an embodiment where the luminaire 110 is an outdoors lamp post and the light source 112 is configured to illuminate the surface below it, the optical sensor 120 may be installed within or near the luminaire 110 so that, during operation, the optical sensor 120 faces downwards, where it's field of view would overlap with the area illuminated by the light source 112, and captures an image containing at least a portion of the light footprint of the light source 112. For example, the optical sensor 120 could be built into the luminaire 110 by facing, during operation, downwards, as shown with an inset A in FIG. 1 illustrating the luminaire 110 comprising a housing 122 in which the light source 112 is arranged in a co-planar arrangement with the optical sensor 120. The co-planar arrangement is evident by noting that a line 124, which represents the optical axis of the light source 112, is parallel to a line 126, which represents the optical axis of the optical sensor 120. The inset A also illustrates that the light source 112 could comprise a plurality of light sources 128, e.g. arranged to form an array delineated by the dashed lines.

Figure 2:
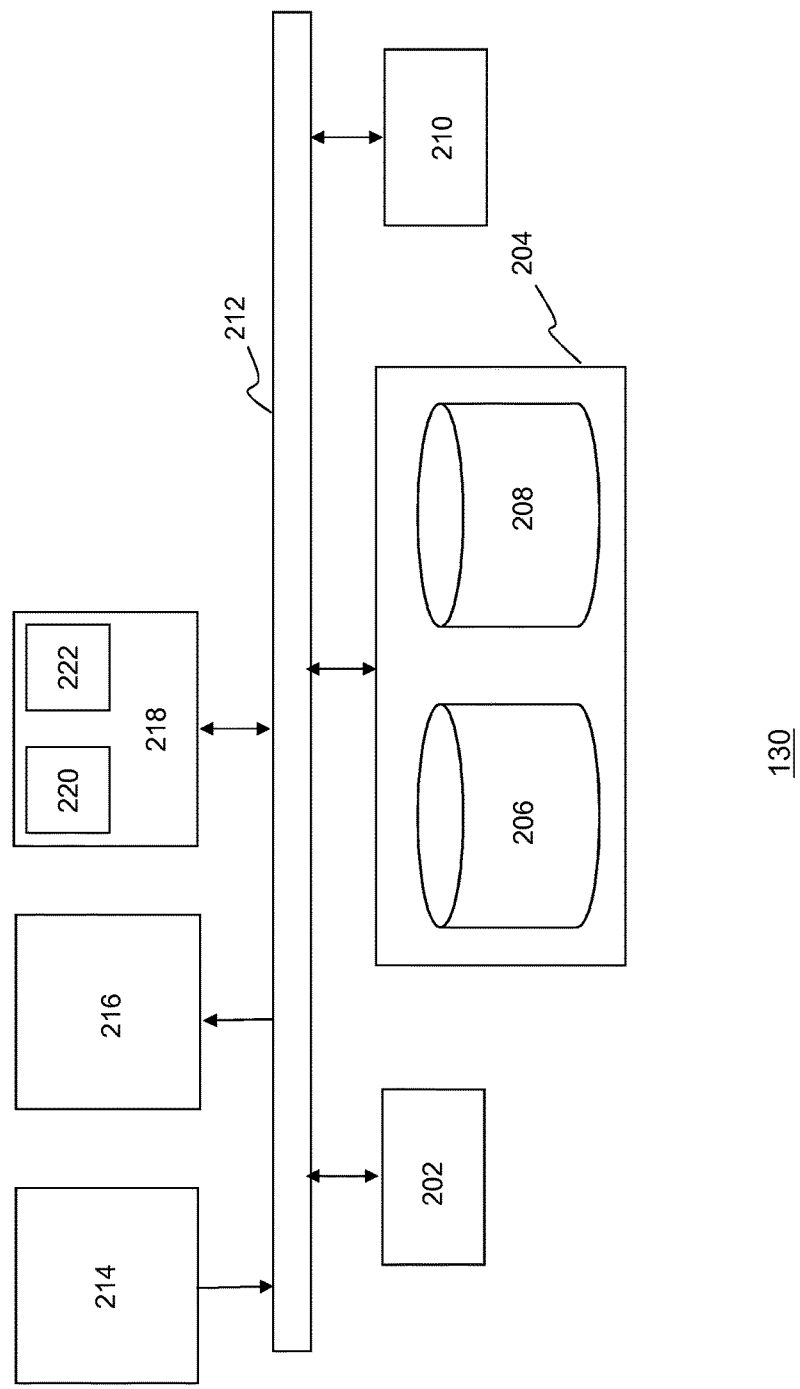
FIG. 2 is a schematic illustration of an electronic device for carrying out methods for determining an unknown position of a light source, according to one embodiment of the present invention.

The device 130, described in greater detail in FIG. 2 is an intelligent controller capable of reading and processing the measurements of the optical sensor 120 according to the methods described herein, to determine the height and/or the orientation in space of the light source 112. As used herein, the term "height" of the light source 112 or the luminaire 120 refers to the shortest distance between the light source 112 and the illuminated surface 140, shown in FIG. 1 with a double arrow 150. As used herein, the term "orientation" of the light source 112 or the luminaire 120 refers to the degree of rotation with respect to one or more axes of rotation. For example, the inset B, in FIG. 1 illustrates, with the two arrows, rotation about the y-axis and rotation about the z-axis, for the x,y,z coordinate system centered at the optical center of the light source 112. In the following description, when orientation is discussed, it is indicated whether the orientation refers to a single axis rotation about the y-axis, a single axis rotation about the z-axis, or a multiple axes rotation about two or more axes. Examples are provided below for the single axis rotation about a y-axis and a z-axis. A single axis rotation about the x-axis is not described herein because analogous considerations apply as those described for the single axis rotation about the y-axis. When the optical axis 124 of the light source 112 is perpendicular to the surface 140, i.e., the optical axis 124 is aligned with the z-axis, the orientation of the light source may be described as 0 degree rotation about the x axis, 0 degree rotation about the y axis, and 0 degree rotation about the z axis, i.e. the (0°, 0°, 0°) rotation.

FIG. 2 is a schematic illustration of an electronic device 200 for carrying out methods enabling determination of the position of the light source 112, according to one embodiment of the present invention. As shown, the electronic device 200 comprises at least a wireless receiver 202 for receiving the images acquired by the optical sensor 130, memory elements 204, and one or more processors 210 coupled to the memory elements 204 and to the receiver 202 through a system bus 212.

The electronic device 200 may be implemented in the form of any system including a processor and memory that is capable of performing the functions described within this specification. In one aspect, the electronic device 200 may be implemented as a computer that is suitable for storing and/or executing program code. To that end, the memory elements 204 may store an application (not shown), the application being implemented in the form of executable program code. The one or more processors 210 may execute the program code accessed from memory elements 204 via the system bus 212. Responsive to executing application, the electronic device 200 may be configured to perform one or more method steps to be described herein in further detail. It should be appreciated that the electronic device 200 may further execute an operating system (not shown) that can facilitate execution of the application.

The memory elements 204 may include one or more physical memory devices such as, for example, local memory 206 and one or more bulk storage devices 208. The local memory 206 may refer to random access memory or other non-persistent memory device(s) generally used during actual execution of the program code. The bulk storage devices 208 may be implemented as a hard drive or other persistent data storage device. The electronic device 200 may also include one or more cache memories (not shown) that provide temporary storage of at least some program code in order to reduce the number of times program code must be retrieved from bulk storage device during execution.

The electronic device 200 may, optionally, include or be coupled to one or more output devices 214 for outputting the determined position of the light source 112. In an embodiment, the output device 214 could comprise a monitor or a display for displaying results of the methods described herein to a user, preferably via a dedicated user interface. Such an embodiment may be particularly useful if the electronic device 200 is a portable electronic device such as e.g. a tablet computer, a laptop computer, a remote control, a smart phone, a PDA, or other handheld device, which the user may carry around to determine positions of the light sources. The display 214 may comprise a touch screen display, also sometimes referred to as a "touchscreen display" or "touch-sensitive display", configured to detect and respond to contact on or near the screen. Such a display may also be considered to be an input device because it allows a user to provide user input to the electronic device 200 by making movements with a physical object such as e.g. a finger of the user or a stylus, on or near the touch screen display. Other examples of output devices which could, optionally, be also coupled to the device 200 include e.g. speakers, or the like.

If a luminaire comprises a light source capable of transmitting data by encoding the data into its light output as e.g. a series of modulations in amplitude or phase of the light signal, a technique sometimes referred to as "coded light", then the output device 214 could be implemented as a device configured for controlling the light source 112 of the luminaire 120 to transmit its determined position information to other parties, e.g. a central controller of the lighting network. Of course, other techniques for transmitting data may be used for transmitting the determined position information, such as e.g. wireless transmission, for example via a WiFi using the data transmitter 222 described below.

The electronic device 200 may further, optionally, include one or more peripheral input devices 216. Examples of the input devices 216 may include, but are not limited to, for example, a keyboard, a pointing device such as a mouse, or the like.

Input devices and/or output devices may be coupled to the electronic device 200 either directly or through intervening I/O controllers.

A network adapter 218 may also be coupled to the electronic device 200 to enable the device 200 to become coupled to other systems, computer systems, remote network devices, and/or remote storage devices through intervening private or public networks. The network adapter may, in particular, comprise a data receiver 220 for receiving data that is transmitted by said systems, devices and/or networks to said data and a data transmitter 222 for transmitting data to said systems, devices and/or networks. Modems, cable modems, and Ethernet cards are examples of different types of network adapter that may be used with the electronic device 200.

The wireless receiver 202 may be implemented as [a part of] the data receiver 220 or it may be implemented as a designated receiver for receiving the acquired images from the optical sensor 130. Thus, as used herein, the term "means for obtaining the first image" may refer to the wireless receiver 202 and/or the data transmitter 220. Similarly, the output device 214 may be implemented as [a part of] the data transmitter 222. Thus, as used herein, the term "output means" may refer to the output device 214 and/or the data transmitter 222.

In the embodiments when the device 130 is configured to control operation of the light source 112 based on determined position of the light source 112, the device 130 may further include a controller for controlling the light source 112 (the controller not shown in FIG. 2). For example, when the light source 112 comprises one or more LEDs, the device 130 may include a driver component (e.g., a conventional LED ballast) capable of turning the LED(s) on or off as necessary and of adjusting the luminous flux of the light produced by the LED(s) by adjusting e.g. the drive current applied to the LED(s) and/or adjusting the timing of the on/off cycle.

Figure 3:
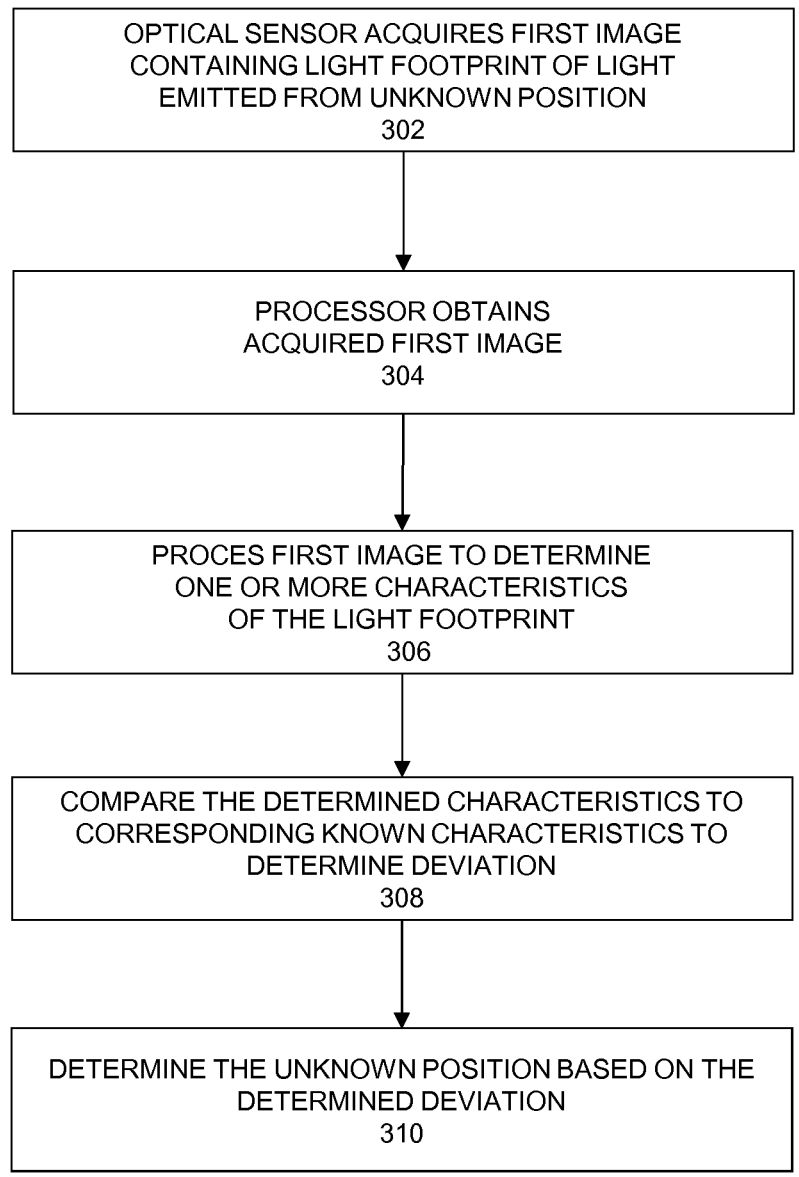
FIG. 3 is a flow diagram of method steps for determining a position of a light source, according to one embodiment of the present invention.

FIG. 3 is a flow diagram of method steps for determining the position of the light source 112, according to one embodiment of the present invention. While the method steps are described in conjunction with the elements illustrated in FIGS. 1 and 2, persons skilled in the art will recognize that any system configured to perform the method steps, in any order, is within the scope of the present invention.

Figure 4:
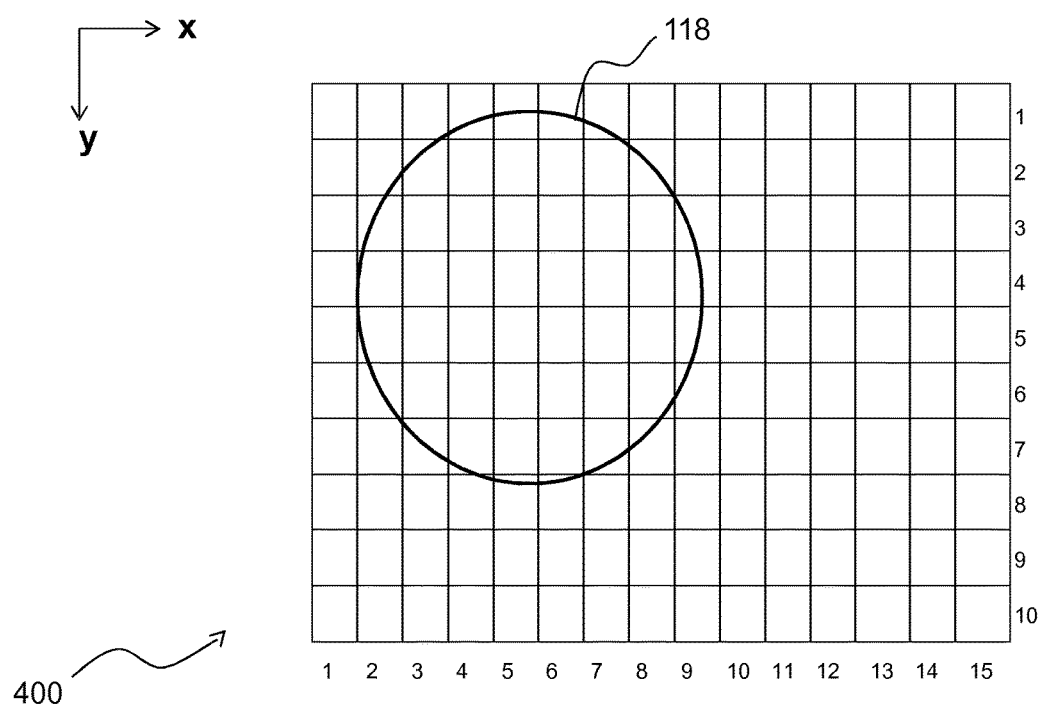
FIG. 4 is a schematic illustration of an exemplary image acquired by an optical sensor, according to one embodiment of the present invention.

The method begins with a step 302 where the optical sensor 120 acquires an image referred to herein as a "first image". The image is acquired while the light source 112 is emitting light. By aligning the field of view of the optical sensor with the area illuminated by the light source 112, the acquired first image contains at least a portion of the light footprint created by the light source 112 on the illuminated surface. The acquired first image contains a plurality of pixels. FIG. 4 provides an example of such pixelated first image 400 containing a light footprint 418, analogous to the light footprint 118 illustrated in FIG. 1. Even though FIG. 4 illustrates that the image 400 contains the entire light footprint 418, of course in other embodiments the image 400 contain only a portion of the light footprint 418, as long as the portion is selected so that the relevant processing described herein can be performed to determine the position information of the light source 112. This is applicable to all of the other first images described herein.

In step 304, the processor 210, communicatively connected to the optical sensor 120 (either directly or via some additional component), obtains the acquired first image from the optical sensor 120. The manner in which the processor 210 can obtain the acquired images from the optical sensor 120 depend on the configuration of the system 100. For example, the processor 210 may be configured to obtain the image via WiFi connectivity in place, e.g. by means of receiving the image from the data receiver 222. Alternatively, the processor 210 may receive the acquired image by means of the specially designated wireless receiver 202. Persons skilled in the art will easily recognize ways for enabling such communication between the processor 210 and the optical sensor 120.

In step 306, the processor 210 can process the obtained first image to determine one or more characteristics of the image of the light footprint. As will become clear from the following illustrative examples, which characteristics of the light footprint are derived from the light footprint depend on the configuration of the elements within the system 100. For example, which characteristics are relevant could depend on whether either the height or the orientation of the light source 112 is fixed and, therefore, known, and only the other, unknown, component of the light source position should be determined, on whether the light source 112 is such that it can only be rotated about a single axis or about two or more axis, or on whether the light source 112 and the optical sensor 120 are co-planar or not.

The processor 210 has access to information indicative of the arrangement of the light source 112 and the optical sensor 120 (co-planar or not). In operation, in case of a co-planar arrangement, the processor 210 will use the proposed methods related to the analysis of the intensity of light footprint to derive the mounting height and/or orientation of the light source while, in case of a non-planar or dislocated arrangement, the processor 210 will use the proposed triangulation methods or shape properties of the light footprint to derive the mounting height and/or orientation of the light source.

The processor 210 has access to information indicative of calculated/expected/predicted/statistical, i.e. known, characteristics of at least one but preferably a plurality of light footprints of light emitted by the light source from different known positions. These known characteristics are the same type of characteristics as those determined by the processor from the acquired image in step 306. These known characteristics are comparable to the characteristics derived from the first image in that they contain information indicative of a light footprint that could be created by the light emitted by the light source 112. However, unlike for the light footprint in the first image, for the light footprints with which the known characteristics are associated, the positions (i.e., the height and the orientation) of the light source 112 that would result in those light footprints are known. Such known characteristics can, therefore, serve as the basis of the comparison for determining the unknown position of the light source 112 that created the light footprint in the first image.

The characteristics of a light footprint of light emitted by a light source such as the light source 112 from a known position that are used as a basis for the comparison may become known in various manners. In one embodiment, these characteristics may be determined based on the simulations with light rendering software tool that would simulate what the light footprint of a light source would be like when the light source is mounted in different mounting positions. In another embodiment, these characteristics may be determined by calibration of an actual representative set-up. In such an embodiment, one or more images similar to the first image (i.e. these images also contain a light footprint of light emitted by the light source as the image is acquired) are acquired in a set-up that is representative of the scenario in which the light source 112 with the unknown position is deployed, except that in this calibration scenario the mounting positions of the light source when the images are acquired are known. The characteristics associated with light footprints of various known positions of the light source may then be determined and stored as "known characteristics" for future comparisons, e.g. within the memory means 204. In other embodiments, a combination of at least these two, and possibly other, manners for determining the values of characteristics that can be used for the comparison may be employed.

The known characteristics may be stored and made available for the comparison in various manners. For example, in one embodiment, the values of the known characteristics may be used. In other embodiments, various derivatives of these values may be used. In yet other embodiments, the light footprints (or adequate portions thereof) having those characteristics may be used, from which the characteristics may be easily determined by the processor 210. Therefore, a term "information indicative of the known characteristics" is used in the present invention to cover the various possible manners for obtaining and storing the known characteristics.

Information indicative of the known characteristics is stored in such a way that, for each set of known characteristics, the position of the light source that would lead to the generation of the light footprint having those characteristics is also available (stored). Such light footprints could be virtual light footprints in that they are not the actual light footprints which are the results of any actual illumination by a light source, but rather sets of data indicative of the one or more characteristics of light footprints that would result if a light source mounted in various positions was illuminating the surface.

The information indicative of the known characteristics may e.g. be stored in a calibration table or a parametric model to which the processor 210 has access. The information indicative of the known characteristics may be pre-programmed in the firmware of the device 130 configured to perform the methods described herein or provided to such a device, e.g. by a light management system (not shown in Figures).

It should be noted that, besides the one or more known characteristics, in order to determine the characteristics in step 306 and to make meaningful comparisons in step 308, the processor 210 must have access to other a priori information. What such information comprises depends on a particular deployment scenario. For example, it may include relative location of the optical sensor 120 with respect to the light source 112, the (road) surface reflectance model, or the characteristics of the optical sensor 120 such as the imager sensitivity and the configuration of the optical system associated with the sensor. The exemplary scenarios described below will provide sufficient information for a skilled person to be able to easily derive, also for other scenarios, which information needs to be available to the processor 210 in order to enable the processor to determine the unknown position of the light source 112.

In step 308, the processor 210 compares the values of the one or more characteristics derived from the first image to the corresponding known characteristics associated with at least one light footprint as would be produced by a light source from at least one known position to determine a deviation between the measured and the known characteristics. Because the characteristics determined from the acquired first image and the known characteristics are comparable in that they both relate to light distribution within at least a portion of a light footprint of the light source 112 (or a light source representative of the light source 112, in case of the known characteristics) and because the position of the light source that led to the creation of the light footprint associated with the known characteristics is known, the calculated deviation allows the processor 210 to determine, in step 310, the unknown position of the light source 112 that led to the generation of the light footprint in the first image.

While comparison with only one set of known characteristics (i.e., characteristics associated with a single light footprint that is or could be generated from a certain known position) is sufficient for the determination of the unknown position of the light source 112, in some embodiments comparisons with multiple sets of known characteristics, associate with different known positions of a light source, could be beneficial, in order to more accurately assess the unknown position. For example, the processor 210 may be configured to make comparisons to the various sets of known characteristics until it has established the set for which the deviation from the characteristics determined from the acquired image in step 306 is the smallest. Then the position of the light source 112 may be determined based on the deviation with that set of known characteristics. Or the processor 210 could first identify which known characteristics have values closest to the values of the determined characteristics of step 306 and only after that calculate the deviation and determine the unknown position.

The following eight scenarios will provide some exemplary scenarios of how exactly the method of FIG. 3 can be implemented. These scenarios may be distinguished based on whether the luminaire 110 and the optical sensor 120 are co-located or not.

In the architecture of the system 100 where the luminaire 110 and the optical sensor 120 are co-located, by design, the geometric relation between the luminaire 110 (namely, the light source 112) and the optical sensor 120 are known. In particular, when the sensor 120 and the luminaire 110 are co-planar (as e.g. illustrated in the inset A of FIG. 1), then the light source 112 and the sensor 120 have the same viewing direction and there is relative small displacement between them, so the optical axis of 124 the light source 112 and the optical axis 126 of the sensor 120 can be considered the same. In reality, these two optical axes are not the same, but are parallel to one another, but due to the small displacements between the light source 112 and the sensor 120 the difference can be neglected. Consequently, triangulation methods cannot be used for determining the position of the light source 112. However, when the optical axis of the light source 112 and the optical axis of the optical sensor 120 are different, also triangulation techniques can be applied to derive the height and orientation of the light source 112. Due to the difference in viewing angles, close object will be observed at a different position in the image than distant objects.

In another architecture, the sensor 120 is dislocated from the luminaire 110. For example, the sensor 120 may be fixed to the light pole 114, a few meters below the luminaire. By design, the geometric relation between the luminaire 110 (namely, the light source 112) and the optical sensor 120 are known. The relative large displacement between them results in significantly different viewpoints. Consequently, triangulation methods can be used for determining the position and orientation of the light source 112.

Scenario 1: Height Determination Based on Intensity Level

This scenario is an example of the co-located and co-planar configuration of the optical sensor 120 and the luminaire 110, such as e.g. shown in the inset A of FIG. 1. The unknown position of the light source 112 comprises only the mounting height of the light source (i.e., the mounting orientation of the light source is known).

FIGS. 5A, 5B, and 5C provide examples of the images 500A, 500B, and 500C as could be acquired by the optical sensor 120 (i.e., the "first images") in step 302 of the method if the light source 112 was mounted at heights of 0.75, 1, and 1.25 (any arbitrary units of distance), respectively. The images 500A-500C contain light footprints 518A-518C, respectively, analogous to the light footprint 118 illustrated in FIG. 1. As can be seen by comparing FIGS. 5A-5C, the higher the mounting height of the light source 112, the less is the intensity of the light distribution within the light footprints 518A-518C, where lower intensity is illustrated with darker shade of grey and higher intensity is illustrated with lighter shade of grey within the light footprints. The point in the images 500A-500C where the x- and the y-axis intersect is the optical axis of the light source 112.

A priori information that may be available to the processor 210 in this scenario could include mounting orientation of the light source 112 (which, in this case, includes the known rotation around luminaire's optical x- and y-axis), the fact that the light source 112 and the sensor 120 are co-located, the relative location of the sensor 120 in relation to the light source 112, the fact that the optical axis of the sensor 120 and the optical axis of the light source 112 are parallel and may be approximately considered the same (co-planar configuration), the light distribution of the light source 112, the road surface reflectance model, the characteristics of the observing optical sensor 120 and, possibly, of a camera module in which such a sensor could be included (e.g. imager sensitivity, optical system), and the position of the observing optical sensor 120 with respect to the light source 112. In addition, the processor 210 has access to at least one but preferably more sets of known characteristics providing information on the relation between the expected light distribution and the height of the light source 112.

Once the processor 210 obtained, in step 304, the first image acquired by the optical sensor (i.e., any one of the images illustrated in FIGS. 5A-5C), the processor 210 having access to the known characteristics and of at least some or all of the above-described a priori information, the method may proceed to step 306 where the processor 210 analyses the acquired image in order to characterize the measured light distribution. FIG. 6 is a schematic illustration of resulting pixel intensity values of a line profile 600 along any line, in the 2D acquired image of one of FIGS. 5A-5C, centered at the optical axis of the light source 112. In other words, FIG. 6 illustrates 1D intensity values along any line that could be drawn on the 2D light footprint of one of FIGS. 5A-5C that contains the point where the x-axis intersects the y-axis (since that intersection point corresponds to the optical axis of the light source 112; the optical axis of the light source 112 being perpendicular to the plane of the 2D images shown in FIGS. 500A-500C). The one or more characteristics derived by the processor 210 from the acquired image in step 306 could include e.g. the value of the maximum intensity value of the curve 600 shown in FIG.

6. Additionally or alternatively, the one or more characteristics could include an intensity at a particular predetermined position within the light footprint 518A-518C, e.g. the intensity at the line profile 600 which is at a particular predetermined distance from the optical axis of the light source 112. Another approach could be the processor 210 taking the sum of all the pixel intensities within the light footprint of FIGS. 5A-5C. An intermediate strategy could be for the processor 210 to take the sum of the intensities of only some of the pixel values within the light footprint of FIGS. 5A-5C, e.g. the sum along a line going through the optical center of the light source 112, e.g. along the x- or y-axis indicated in FIGS. 5A-5C by the black arrows.

Once the processor 210 derived the one or more relevant characteristics related to the measured light distribution from one of the acquired images 500A-500C, the processor 210 proceeds, in step 308, to compare the measured light distribution represented by the determined characteristics with one or more of the known light distributions represented by the known characteristics, e.g. as stored in the calibration table or a parametric model. In particular, the processor 210 compares the values of the one or more characteristics that were derived from the acquired first image taken from the position of an unknown height to the analogous known characteristics associated with certain known heights to determine a deviation between the determined and the known characteristics. As a part of step 308, the processor 210 may identify which one of the predetermined known light distributions has the closest match to the values of the one or more characteristics derived in step 306. Based on the determined deviation, the processor 210 determines, in step 310, the unknown height of the light source 112, e.g. as the height associated with the closest match. The processor 210 may further refine the actual height by interpolation of the closest height values found in the calibration table or the parametric model.

Scenario 2: Orientation Determination Based on Intensity Gradient

This scenario is another example of the co-located and co-planar configuration of the optical sensor 120 and the luminaire 110, such as e.g. shown in the inset A of FIG. 1. In this scenario, the unknown position of the light source 112 comprises the mounting orientation of the light source. In particular, the orientation in this case is a rotation of the light source around a single axis of rotation that lies in a plane parallel to the light footprint 118 (that plane is shown in FIG. 1 with a dashed line 160, indicating that the plane 160 is perpendicular to the plane of view of FIG. 1). Such axis of rotation could be the y-axis shown in the present figures, but analogous reasoning would apply to any other axis in the plane 160. The unknown position may also further include the mounting height of the light source.

Figures 7A, 7B, 7C:
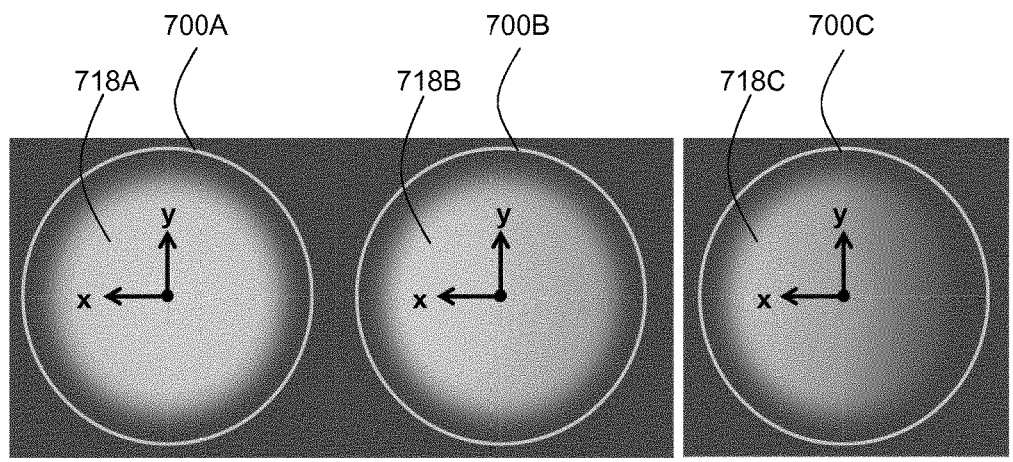
FIGS. 7A, 7B, and 7C provide examples of images acquired by an optical sensor when a light source is mounted at various rotations around the y-axis, according to one embodiment of the present invention.

FIGS. 7A, 7B, and 7C provide examples of the images 700A, 700B, and 700C as could be acquired by the optical sensor 120 (i.e., the "first images") in step 302 of the method if the light source 112 was mounted at mounting orientations with rotations about the y-axis of 0 degrees (i.e., no rotation), 15 degrees, and 30 degrees, respectively. The images 700A-700C contain light footprints 718A-718C, respectively, analogous to the light footprint 118 illustrated in FIG. 1. As can be seen by comparing FIGS. 7A-7C, the greater the rotation of the light source 112 around the y-axis, the greater is the change (i.e., the gradient) in the intensity of the light distribution within the light footprints 718A-718C across a line perpendicular to the y-axis, where lower intensity is illustrated with darker shade of grey and higher intensity is illustrated with lighter shade of grey within the light footprints. Such a line perpendicular to the y-axis is, therefore, referred to herein as a "gradient line". For example, the x-axis could be considered as a gradient line. The point in the images 700A-700C where the x- and the y-axis intersect is the optical axis of the light source 112.

It should be noted that, to be more exact, the y-axis shown in the images 700A-700C is actually a representation of the projection of the y-axis which was described to go through the optical center of the light source 112 on to the plane of the light footprint 118. A gradient line would then be any line within the images 700A-700C that is perpendicular to that line. The x-axis as shown in FIGS. 7A-7C (or, to be more exact, the projection of the x-axis on to the plane of the light footprint 118) could serve as the gradient line. However, any other line in the 2D images 700A-700C that is perpendicular to the (projection of) y-axis could serve as the gradient line.

A priori information that may be available to the processor 210 in this scenario could include the fact that the light source 112 and the sensor 120 are co-located, the relative location of the sensor 120 in relation to the light source 112, the fact that the optical axis of the sensor 120 and the optical axis of the light source 112 are parallel and may be approximately considered the same (co-planar configuration), the light distribution of the light source 112, the road surface reflectance model, the characteristics of the observing optical sensor 120 and, possibly, of a camera module in which such a sensor could be included (e.g. imager sensitivity, optical system), and the position of the observing optical sensor 120 with respect to the light source 112. In addition, the processor 210 has access to information regarding one or more light footprints of light emitted by the light source from the known positions providing information on the relation between the expected light distribution and the rotation of the light source 112 about the y-axis.

Figures 8A, 8B, 8C:
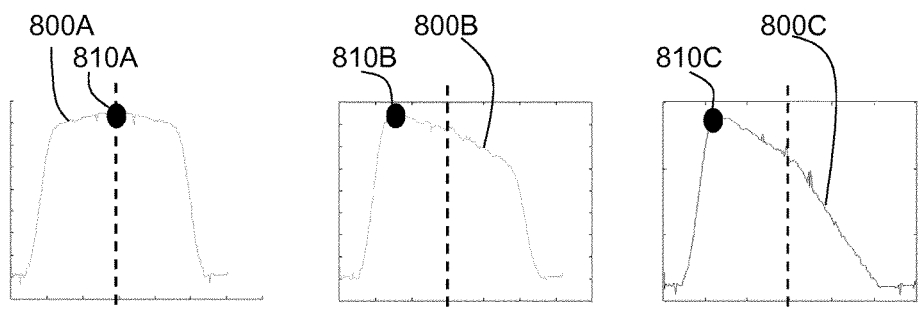
FIGS. 8A, 8B, and 8C provide schematic illustrations of pixel intensity values of a line profile along the x-axis of the light footprint in the corresponding images shown in FIGS. 7A, 7B, and 7C, respectively, according to one embodiment of the present invention.

Once the processor 210 obtained, in step 304, the first image acquired by the optical sensor (i.e., any one of the images illustrated in FIGS. 7A-7C), the processor 210 having access to the known characteristics and of at least some or all of the above-described a priori information, the method may proceed to step 306 where the processor 210 analyses the acquired first image in order to characterize the measured light distribution. FIGS. 8A, 8B, and 8C provide schematic illustrations of resulting pixel intensity values of line profiles 800A, 800B, and 800C along one of the gradient lines in the 2D acquired image of FIGS. 7A, 7B, and 7C, respectively, e.g. along the x-axis. The characterization of step 306 comprises the processor 210 deriving one or more characteristics indicative of a gradient in intensity distribution in the first image along such a gradient line, i.e. determining characteristics indicative of the gradient in one of the line profiles 800A-800C that corresponds to the first image such as the image 700A, 700B, or 700C.

In an embodiment, one characteristic indicative of the gradient could comprise a location along the x-axis, with respect to an optical axis of the camera or an optical axis of the light source (shown in FIGS. 8A-8C with a dashed line), of maximum intensity within the light footprint. As can be seen from the inspection of FIGS. 8A-8C, when the rotation is 0 degrees (i.e., FIG. 8A), the maximum intensity point 810A is centered in the line profile 800A, i.e. it is at the optical axis shown with the dashed line. When, however, the rotation around the y-axis increases to 15 degrees (i.e., FIG. 8B), the maximum intensity point 810B is shifted away from the optical axis shown with the dashed line. As the rotation around the y-axis increases even further, to 30 degrees (i.e., FIG. 8C), the maximum intensity point 810C is shifted away from the optical axis shown with the dashed line even further.

Alternatively or additionally, another characteristic indicative of the gradient could that the processor 210 determines could comprise an intensity distribution within the light footprint along the gradient line (i.e., intensity distribution in the line profile 800A-800C), and/or intensities at two or more different predetermined positions along the gradient line within the first image (i.e., intensities at two or more different positions in the line profile 800A-800C).

Once the processor 210 derived the one or more relevant characteristics related to the gradient in one of the line profiles 800A-800C, the processor 210 proceeds, in step 308, to compare the measured gradient with the known gradient values, i.e., gradient values from the light footprints associated with one or more different known positions, as e.g. stored in the calibration table or a parametric model and associated to a particular level of rotation about the y-axis. As a part of step 308, the processor 210 may identify which one of the known gradient value(s) are closest to the corresponding values of the one or more gradient characteristics derived in step 306 and determined the deviation. Once one of the deviation has been determined, the processor 210 determines, in step 310, the unknown orientation of the light source 112, e.g. as the orientation associated with the known characteristics that have the closest match. The processor 210 may further refine the actual rotation of the light source 112 by interpolation of the closest height values found in the calibration table or the parametric model.

Once the rotation around the y-axis has been determined, the processor 210 may follow a method similar to that described in scenario 1 for determining the mounting height of the light source 112, if the height is unknown. To that end, the processor 210 may derive one or more further characteristics along a line in the first image perpendicular to the gradient line (i.e., along a line parallel to the y-axis), referred to herein as a "height line". Preferably such the height line contains the optical axis of the light source (i.e., it's the line shown as the y-axis in images 700A-700C), but any other line parallel to the y-axis within the light footprint could be used. For the height line being the x-axis, the line profile similar to the one shown in FIG. 6 would be obtained (i.e., in this example—no gradient there because the light source is not rotated around the x-axis).

The one or more characteristics derived by the processor 210 from the acquired first image in this repetition of step 306 for the determination of height could include e.g. the value of the maximum intensity value of a curve comprising the line profile for the height line. Additionally or alternatively, the one or more characteristics could include an intensity at a particular predetermined position on the height line within the light footprint 718A-718C, e.g. the intensity at the line profile 600 which is at a particular predetermined distance from the optical axis of the light source 112. Another approach could be the processor 210 taking the sum of all the pixel intensities along the height line within the light footprint of FIGS. 7A-7C. An intermediate strategy could be for the processor 210 to take the sum of the intensities of only some predetermined pixels along the height line within the light footprint of FIGS. 7A-7C.

The processor 210 can then repeat step 308 for the determination of height by comparing the one or more of the determined further characteristics of the light footprint within the first image to the one or more corresponding known further characteristics of light footprints associated with known heights. The latter light footprints may, but do not have to be the same as the light footprints described above in this scenario in context of rotation determination. The light footprints described in this scenario in context of rotation determination were the light footprints used for the comparison of light distributions at different rotations around the y-axis, while the light footprints described in scenario 1 and now used for the height determination are the light footprints used for the comparison of light distributions at different heights for a particular known orientation.

Thus, once the processor 210 derived the one or more relevant further characteristics along the height line in one of the acquired images 700A-700C, the processor 210 proceeds, in step 308, to compare the derived values (i.e., the further values from first image) with the value(s) of the analogous known characteristic(s), e.g. stored in the calibration table or a parametric model. In particular, the processor 210 compares the values of the one or more characteristics that were derived from the acquired first image taken from the position of an unknown height to the analogous characteristics of one or more of light footprints which are associated with certain, known, heights. As a part of step 308, the processor 210 may identify which one of the known light distributions has the closest match to the values of the one or more further, height, characteristics derived in step 306. Based on the determined deviation, the processor 210 determines, in step 310, the unknown height of the light source 112, e.g. as the height associated with the closest match. The processor 210 may further refine the actual height by interpolation of the closest height values found in the calibration table or the parametric model.

Scenario 3: Height and Orientation Determination Based on Intensity Distribution This scenario is an example of the co-located and co-planar configuration of the optical sensor 120 and the luminaire 110, such as e.g. shown in the inset A of FIG. 1. The unknown position of the light source 112 comprises both the mounting height and the mounting orientation of the light source, where the orientation comprises a rotation around one or more of axes of rotation.

A priori information that may be available to the processor 210 in this scenario could include the light distribution of the light source 112, the fact that the light source 112 and the sensor 120 are co-located, the relative location of the sensor 120 in relation to the light source 112, the fact that the optical axis of the sensor 120 and the optical axis of the light source 112 are parallel and may be approximately considered the same (co-planar configuration), the road surface reflectance model, the characteristics of the observing optical sensor 120 and, possibly, of a camera module in which such a sensor could be included (e.g. imager sensitivity, optical system), and the position of the observing optical sensor 120 with respect to the light source 112. In addition, the processor 210 has access to information regarding one or more light footprints of light emitted by the light source from the known positions providing information on the relation between the expected light distribution and the height and orientation of the light source 112.

Once the processor 210 obtained, in step 304, the first image acquired by the optical sensor, in step 306 the processor 210 characterizes the light distribution in the acquired image by determining intensities at the at least two, but preferably more, different predetermined points in the image. The points are selected so that they would be representative of the light distribution in the light footprint which would make comparison with the light distribution in the one or more light footprints of light emitted by the light source from the known positions possible because in step 308 the processor 210 looks up which one of the known characteristics has the closest match (i.e., the smallest deviation) to the values determined in step 306. The height and orientation is then determined in step 310 as those corresponding to the closest match identified in step 308 or interpolated from the position of the closest match based on the amount of the deviation.

For example, the processor 210 may compare the light distribution in the light footprint of the first image with the known light distribution stored in the calibration table by for example analyzing the gradient in the expected axis of rotation. The actual rotation could be derived by comparison of the light distribution determined from the acquired first image with light distributions stored in the calibration table or a parametric model that contains light distributions for the various known combinations of heights and orientations of light sources. The characteristics of the light distribution can be derived by taking the shape of the distribution for comparison. An intermediate strategy could be to sample the distribution on only a few locations to characterize the deformation of the symmetric shape of the light distribution. The closest matching distribution and its associated height and rotation can be obtained from the calibration table or parametric model. The actual rotation could be refined by interpolation of the closest height values found in the calibration table.

Scenario 4: Height and Orientation Determination Based on Intensity Distribution This scenario is an example of the dislocated or non-planar configuration of the optical sensor 120 and the luminaire 110, such as e.g. shown FIG. 9. The unknown position of the light source 112 comprises at least the mounting orientation and possibly also the mounting height of the light source. The orientation comprises a rotation around one or more of axes of rotation.

A priori information that may be available to the processor 210 in this scenario could include the light distribution of the light source 112, the road surface reflectance model, the characteristics of the observing optical sensor 120 and, possibly, of a camera module in which such a sensor could be included (e.g. imager sensitivity, optical system), and the relative position of the sensor 120 with respect to the light source 112. In addition, the processor 210 has access to one or more sets of known characteristics providing information about an expected light distribution for a different 3D pose of the light source 112, thus providing information on the relation between a light distribution and a 3D pose of a light source.

Once the processor 210 obtained, in step 304, the first image acquired by the optical sensor, in step 306 the processor 210 characterizes the light distribution in the acquired image by determining one or two characteristics indicating of the shape of the light footprint in the image because the shape of the light footprint is directly related to the 3D orientation of the light source.

Figure 10A:
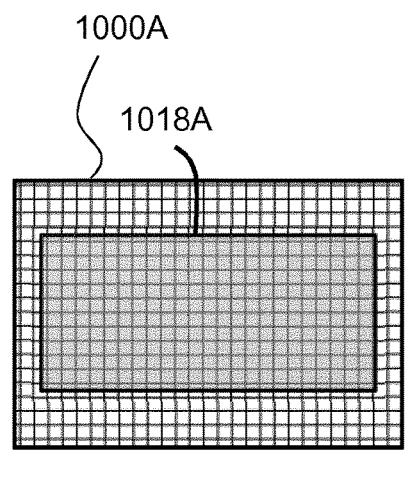
FIGS. 10A and 10B provide examples of images acquired by an optical sensor when a light source is mounted at various orientations, according to one embodiment of the present invention.
Figure 10B:
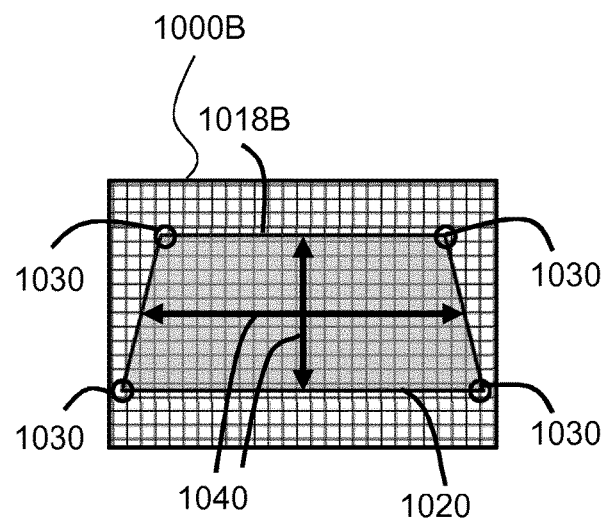

FIGS. 10A and 10B provide examples of images 1000A and 1000B, respectively, acquired by an optical sensor when a light source is mounted at various orientations, according to one embodiment of the present invention. In particular, FIG. 10A illustrates the observed shape of a light footprint 1018A from a set-up of the lighting system 100 with both the optical axis of the light source 112 and the optical axis of the optical sensor 120 being perpendicular to the road surface (i.e., perpendicular to the plane containing the light footprint 1018A). FIG. 10B, on the other hand, illustrates the observed shape of a light footprint 1018B from a similar set-up of the lighting system 100 but with the light source 112 being rotated around the row axis of the optical sensor 120. As a result, the light footprint 1018B in FIG. 10B has a trapezoidal shape, where the exact shape of the trapezoid depends on the degree of rotation. The one or more characteristics that could be used to describe the shape properties required for the 3D pose estimation algorithm include the contour of the shape as shown with the line 1020 outlining the light footprint 1018B, the circles 1030 illustrating the extreme points of the shape contour, and the two double-sides arrows 1040 showing the minor and major axes of the shape of the light footprint 1018B.

Once the processor 210 has characterized, in step 306, the shape of the light footprint in the first image acquired by the optical sensor, the method proceeds to step 308 where the processor 210 compares the one or more characteristics indicative of the shape in the first image to similar known characteristics associated with known orientations of a light source to determine the deviation and then, based on the deviation, in step 310, to determine the unknown orientation of the light source 112. Alternatively or additionally, the orientation of the light source 112 could be derived or determined more accurately by fitting the shape of the light footprint as determined from the acquired image to a parametric model. The latter method to derive/estimate the 3D pose of a known object from a 2D image is widely applied in computer vision.

When the orientation of the light source is known, a method as described in scenario 1 could be used to determine the height of the light source 112, in case the height is unknown. Since such a description was already provided in scenario 1 and repeated for height determination in scenario 2, in the interests of brevity this description is not repeated here.

Scenario 5: Orientation Determination Based on Triangulation

Figure 9:
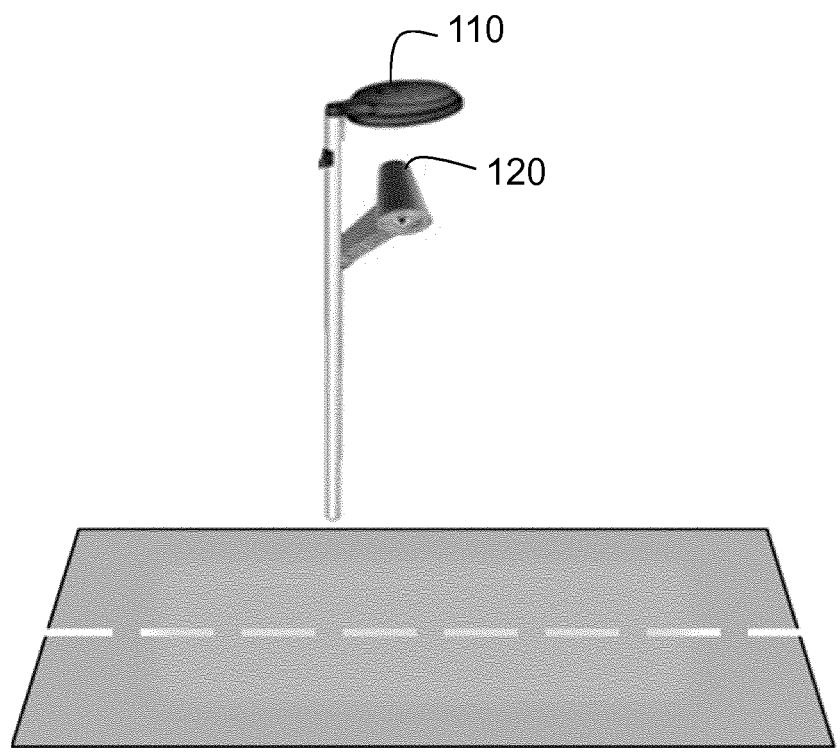
FIG. 9 provides a schematic illustration for a light sensor dislocated from a light source, according to one embodiment of the present invention.

This scenario is another example of the dislocated and non-planar configuration of the optical sensor 120 and the luminaire 110, such as e.g. shown in FIG. 9. In this scenario, the unknown position of the light source 112 comprises the mounting orientation of the light source. In particular, the orientation in this case is a rotation of the light source around a single axis of rotation that lies in a plane parallel to the light footprint 118 (that plane is shown in FIG. 1 with a dashed line 160, indicating that the plane 160 is perpendicular to the plane of view of FIG. 1). Such axis of rotation could be the y-axis shown in the present figures, but analogous reasoning would apply to any other axis in the plane 160.

Figure 11A:
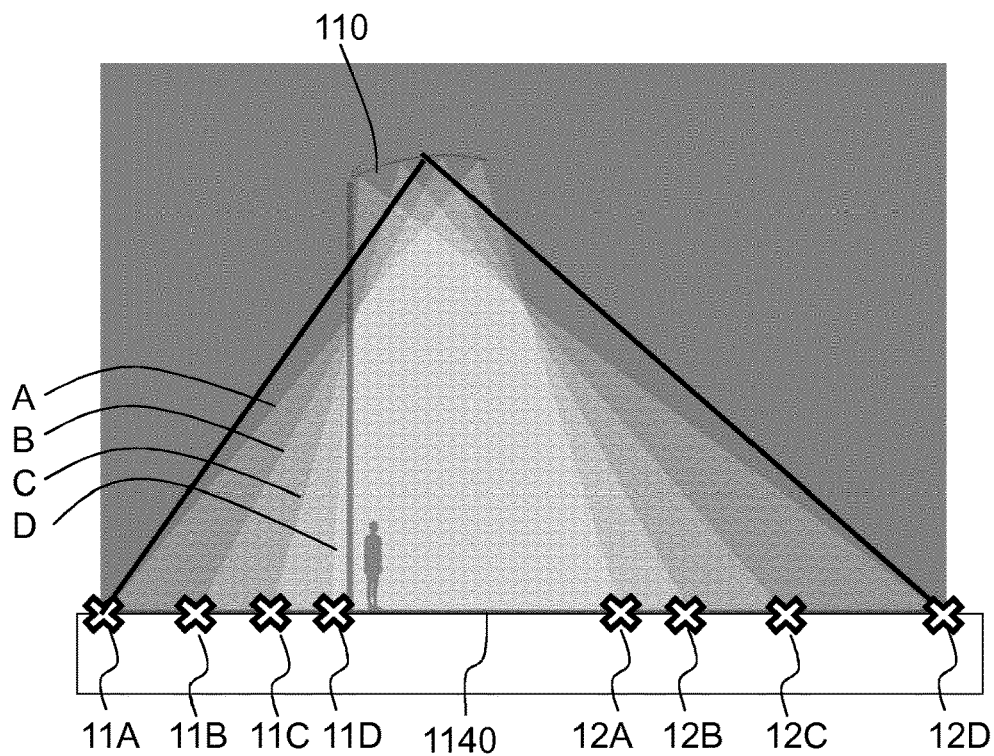
FIGS. 11A and 11B illustrate determining an unknown mounting orientation of a light source when the mounting height of the light source is known and when the light source is mounted at different orientations, according to one embodiment of the present invention.
Figure 11B:
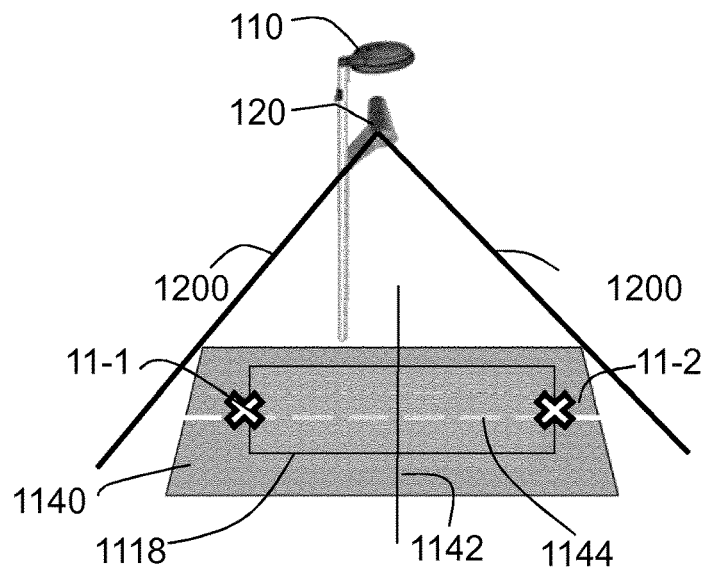

FIGS. 11A and 11B illustrate how triangulation can be used to determine the orientation of the light source 112. FIGS. 11A and 11B illustrate the luminaire 110 comprising the light source 112 that provides illumination. FIG. 11A illustrates light cones A, B, C, and D produced by the light source 112 from different orientations that comprise single axis rotation about the y-axis. The light cones A-D produce light footprints on the ground plane 1140 (perpendicular to the plane of the drawing). The extreme points (the edges) of the light footprints produced by the cones A, B, C, and D, are shown in FIG. 11A as points 11A and 12A for the cone A, points 11B and 12B for the cone B, points 11C and 12C for the cone C, and points 11D and 12D for the cone D.

Inspecting FIG. 11A reveals that the locations of these extreme points along the line shown in FIG. 11A (i.e. along a line, in the plane of the light footprint, that is perpendicular to a line that is a projection of the axis of rotation onto the plane of the footprint) is dependent on the amount of rotation around the y-axis. Therefore, any one of these extreme points can serve as a basis for determining the rotation of the light source 112 with respect to the y-axis.

FIG. 11B provides a different view for one of the light cones produced by the luminaire 110. FIG. 11B illustrates that as long as the field of view 1120 of the optical sensor 120 is such that it can cover the light footprint 1118 in the ground plane 1140, the image acquired by the optical sensor will contain the light footprint 1118 and the processor 210 will be able to identify one or both of the extreme points 11-1 and 11-2. FIG. 11B also provides an illustration of a line 1142 that is a projection of the axis of rotation (i.e., of the y-axis) on to the plane 1140 of the light footprint 1118 and of a line 1144 that is perpendicular to the projection 1142. Based on any one of the extreme points of the light footprint 1118 along the line 1144 or any line parallel to the line 1144 that crosses the light footprint 1118, the processor 210 can determine the y-axis rotation of the light source 112 by comparing the location of any one of the extreme points 11-1 and 11-2 with a corresponding known location for light footprints associated with known rotations.

Scenario 6: Height Determination Based on Triangulation

This scenario is another example of the dislocated and non-planar configuration of the optical sensor 120 and the luminaire 110, such as e.g. shown in FIG. 9. In this scenario, the unknown position of the light source 112 comprises the mounting height of the light source.

Figures 12A, 12B:
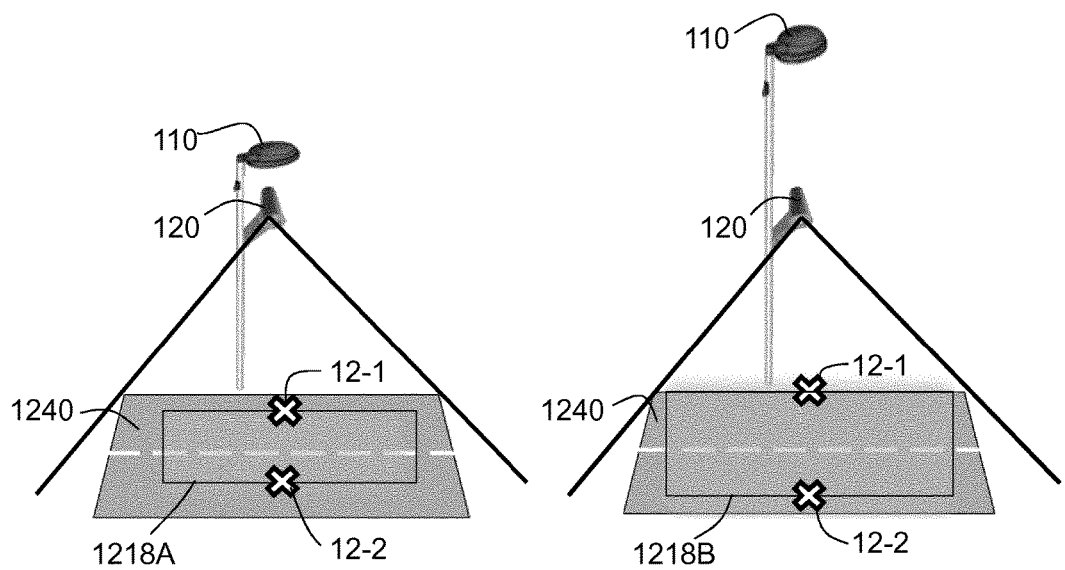
FIGS. 12A and 12B illustrate determining an unknown mounting height of a light source when the mounting orientation of the light source is known and when the light source is mounted at different heights, according to one embodiment of the present invention.

FIGS. 12A and 12B illustrate how triangulation can be used to determine the height of the light source 112. FIGS. 12A and 12B illustrate the luminaire 110 comprising the light source 112 that provides illumination, where FIG. 12A differs from FIG. 12B in that in FIG. 12B the luminaire 110 is mounted higher than in FIG. 12A. The light cones generated by the light source of the luminaire 110 produce light footprints on the ground plane 1240 (the ground plane 1240 being perpendicular to the plane of the drawing), the light footprints shown as footprints 1218A and 1218B in FIGS. 12A and 12B, respectively.

Comparing FIGS. 12A and 12B reveals that the areas of the light footprints 1218A and 1218B is dependent on the height of the light source 112. Therefore, any of characteristics of the light footprints 1212A and 1218B that are indicative of the area of the footprints could serve as a basis for determining the height of the light source 112. For example, a location within the acquired image of any one of the extreme points of the light footprint could serve as such a basis, as long as it is predetermined which extreme point is being considered and compared with the known location of the corresponding point associated with light footprints of known heights. For example, any one of the points 12-1 and 12-2 could serve as such basis.

Based on any one of the predetermined extreme points of the light footprints 1218A and 1218B, the processor 210 can determine the height of the light source 112 by comparing the location of the predetermined extreme point within the acquired image with a corresponding known location for light footprints associated with known heights.

Scenario 7: Orientation and Height Determination Based on Triangulation

This scenario is another example of the dislocated and non-planar configuration of the optical sensor 120 and the luminaire 110, such as e.g. shown in FIG. 9. In this scenario, the unknown position of the light source 112 comprises both the mounting height and the mounting orientation of the light source. In particular, the orientation in this case is a rotation of the light source around a single axis of rotation that lies in a plane parallel to the light footprint 118 (that plane is shown in FIG. 1 with a dashed line 160, indicating that the plane 160 is perpendicular to the plane of view of FIG. 1). Such axis of rotation could be the y-axis shown in the present figures, but analogous reasoning would apply to any other axis in the plane 160.

FIGS. 13A and 13B illustrate how triangulation can be used to determine both the orientation (single-axis rotation) and the height of the light source 112. FIGS. 13A and 13B illustrate the luminaire 110 comprising the light source 112 that provides illumination, where FIG. 13A differs from FIG. 13B in that in FIG. 13B the luminaire 110 is mounted higher than in FIG. 13A and is also rotated around the y-axis with respect to the luminaire orientation in FIG. 13A. The light cones generated by the light source of the luminaire 110 produce light footprints on the ground plane 1340, the light footprints shown as footprints 1318A and 1318B in FIGS. 13A and 13B, respectively.

This scenario is a combination of the scenarios 5 and 6 described above. The teaching of scenario 5 where the locations of the extreme points along the line shown in FIG. 11A (i.e. along a line, in the plane of the light footprint, that is perpendicular to a line that is a projection of the axis of rotation onto the plane of the footprint) were dependent on the amount of rotation around the y-axis is applicable here. However, the locations of these points can also change because of the change in the mounting height of the luminaire. Therefore, when not only rotation but also the height of the luminaire is unknown, it is also necessary to determine characteristics indicative of the area of the light footprints in the acquired images. The teaching of scenario 6 where comparison of FIGS. 13A and 13B revealed that the areas of the light footprints 1318A and 1318B is dependent on the height of the light source 112 is applicable here.

Therefore, any one of these extreme points can serve as a basis for determining the rotation of the light source 112 with respect to the y-axis. Therefore, in order to resolve the rotation around the y-axis and the height of the luminaire 110, any of characteristics of the light footprints 1318A and 1318B that are indicative of the area of the footprints in combination with any of characteristics of the light footprints 1318A and 1318B indicative of the location of the footprints within the acquired images could serve as a basis for determining both the height and the rotation around the y-axis of the light source 112. Such characteristics could comprise e.g. the locations of both of the crosses 13-1 and 13-2 or the locations of both of the crosses 13-3 and 13-4.

Scenario 8: Orientation Determination Based on Different Surface Reflectance This scenario is another example of the co-located and co-planar configuration of the optical sensor 120 and the luminaire 110, such as e.g. shown in the inset A of FIG. 1. In this scenario, the unknown position of the light source 112 comprises the mounting orientation of the light source. In particular, the orientation in this case is a rotation of the light source around a single axis of rotation that is perpendicular to the light footprint 118 (i.e., around the z-axis shown in the present figures).

Figure 14:
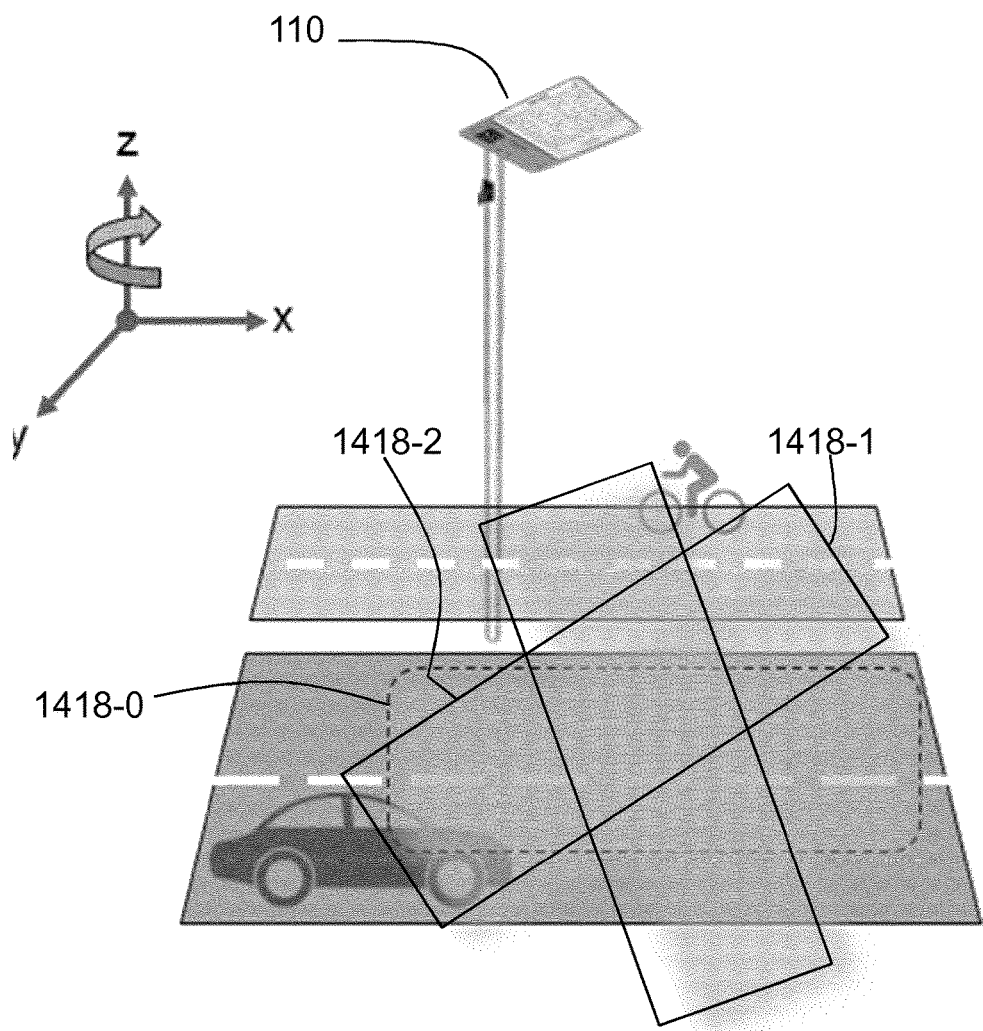
FIG. 14 is a schematic illustration of light footprints that result when a light source is mounted at various rotations about the z-axis, according to one embodiment of the present invention.

FIG. 14 provides schematic illustration of light footprints 1418-1 and 1418-2 that result from two different rotations of the luminaire 110 around the z-axis (of ~110 degrees for the footprint 1418-1 and ~30 degrees for the footprint 1418-2), according to one embodiment of the present invention. Dotted boundary 1418-0 refers to the original orientation of the luminaire 110.

FIG. 15A provides examples of images 1500-1 and 1500-2 as could be acquired by the optical sensor 120 (i.e., the "first images") in step 302 of the method if the light source 112 was mounted at mounting orientations with rotations about the z-axis of ~110 degrees for the top image (i.e., the image containing the light footprint 1418-1) and of ~30 degrees for the bottom image (i.e., the image containing the light footprint 1418-2). FIG. 15B illustrates respective pixel intensities as seen on the line profile (1D) for the light distribution shapes shown in FIG. 15A. In FIG. 15B, again, the top drawing refers to scenario of ~110 degrees rotation, the bottom drawing refers to scenario of ~30 degrees rotation. The dotted box 1510 refers to the 2D light distribution required to extract the direction of rotation (clockwise/anti-clockwise).

As can be seen by comparing the light footprints in the top image of FIG. 15A and in the bottom image of FIG. 15A, due to the different surface reflectance of different surfaces (e.g. surface of an asphalt road vs surface of a curbside vs surface of surrounding vegetation), rotation of the light source 112 around the z-axis changes the light distribution within the light footprints 418-1 and 1418-2, where lower intensity is illustrated with darker shade of grey and higher intensity is illustrated with lighter shade of grey within the light footprints. Therefore, analyzing the change in the intensity in the light distribution (i.e., the gradient) and comparing to some known values may allow calculation of the unknown rotation around the z-axis.

A priori information that may be available to the processor 210 in this scenario includes, first of all, the road surface reflectance model. Such a model includes information on road topology and/or layout, e.g. information on whether the road is an asphalt road, information on the surrounding vegetation, information on the location and presence of a curbside, etc. In addition, the a priori information could include the fact that the light source 112 and the sensor 120 are co-located, the relative location of the sensor 120 in relation to the light source 112, the fact that the optical axis of the sensor 120 and the optical axis of the light source 112 are parallel and may be approximately considered the same (co-planar configuration), the light distribution of the light source 112, the characteristics of the observing optical sensor 120 and, possibly, of a camera module in which such a sensor could be included (e.g. imager sensitivity, optical system), and the position of the observing optical sensor 120 with respect to the light source 112. Further, the processor 210 has access to information regarding one or more light footprints of light emitted by the light source from the known positions providing information on the relation between the expected light distribution and the rotation of the light source 112 about the y-axis.

Once the processor 210 obtained, in step 304, the first image acquired by the optical sensor (i.e., any one of the images illustrated in FIG. 15A), the processor 210 having access to the known characteristics and of at least the road surface reflectance model and possibly some or all of the other above-described a priori information, the method may proceed to step 306 where the processor 210 analyses the acquired first image in order to characterize the measured light distribution by e.g. analyzing the gradient in the acquired image. Such an analysis could be done according to two different approaches described below.

In the first approach, the processor 210 could analyze the 1D distribution of the light profile within the light footprint of the acquired image to determine the location of some characteristic point in the gradient (e.g. the location of the maximum gradient or the location of the point where the gradient becomes non-zero, i.e. the edge where the intensity in the light distribution changes) in the light profile from its expected location (i.e., the location in the one or more light footprints of light emitted from different known positions) to get the change/amount in rotation. The 1D profile may be analyzed in the manner analogous to e.g. that described in scenarios 2 or 3, which description is, therefore, not repeated here.

While such an approach would not give an idea of the direction of rotation (clock-wise/anti-clockwise), in some deployment scenarios the information about the amount of rotation could already be sufficient.

In the second approach, it is possible to not only determine the amount of rotation about the z-axis but also the direction of such a rotation. In such an approach, using the 2D light-distribution such as e.g. shown with the box 1510 in FIG. 15A, taken from a region of minimum of 2×2 pixels within the acquired light footprint, allows determining the gradient within the 2D area as well as estimating the direction of the gradient, which not only gives the change/amount in rotation, but also the direction of that rotation, solving the ambiguity issue otherwise persistent with the first approach. The orientation gradient can be computed by first computing the derivatives in the horizontal and vertical directions and second computing the direction of the vector consisting of the derived derivatives in horizontal and vertical directions.

In various embodiments of this scenario, the characteristics of the light distribution can be derived by taking the shape of the distribution for comparison. An intermediate strategy could be to sample the distribution on only a few locations within the acquired image to characterize the deformation of the symmetric shape of the light distribution within the light footprint.

As previously described herein, the closest matching distribution and its associated rotation can be obtained from the calibration table. The processor 210 may further refine the actual rotation of the light source 112 by interpolation of the closest height values found in the calibration table or the parametric model.

Once the rotation around the z-axis has been determined, the processor 210 may follow a method similar to that described in scenarios 1 and 2 for determining the mounting height of the light source 112, if the height is unknown.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the one or more processors 210, described herein.

While the forgoing is directed to embodiments of the present invention, other and further embodiments of the invention may be devised without departing from the basic scope thereof. For example, aspects of the present invention may be implemented in hardware or software or in a combination of hardware and software. Therefore, the scope of the present invention is determined by the claims that follow.

The invention claimed is:

1. A method for determining a position of a light source of a luminaire based on a first image, the first image having been acquired by a camera and containing at least a portion of a light footprint of light emitted by the light source from the position, the method comprising steps of:
   processing the first image to determine one or more characteristics of the light footprint within the first image;
   comparing the one or more determined characteristics with one or more known characteristics of a light footprint of light emitted by the light source from a known position to determine a deviation between the one or more determined characteristics and the one or more known characteristics; and
   determining the position of the light source based on the determined deviation, wherein the position of the light source comprises at least one of a mounting rotation of the light source about a predetermined axis of rotation in a plane parallel to the light footprint of light emitted by the light source or a mounting height of the light source.

2. The method according to claim 1, wherein the position of the light source comprises a mounting height of the light source and wherein the one or more characteristics of the light footprint comprise a maximum intensity within the light footprint, an intensity at a predetermined position within the light footprint, and/or a sum of intensities at two or more different predetermined positions within the light footprint.

3. The method according to claim 1, wherein:
   the position of the light source comprises a mounting rotation of the light source about a predetermined axis of rotation in a plane parallel to the light footprint of light emitted by the light source,
   the light footprint of light emitted by the light source from the known position is a light footprint of light emitted by the light source from a known mounting rotation of the light source about the predetermined axis of rotation, and
   the one or more characteristics of the light footprint comprise one or more characteristics indicative of a gradient in intensity distribution in the light footprint along a gradient line in the light footprint, the gradient line being perpendicular to a projection of the predetermined axis of rotation onto the light footprint.

4. The method according to claim 3, wherein the position of the light source further comprises a mounting height of the light source and wherein the method further comprises:
   processing the first image to determine one or more further characteristics of the light footprint within the first image, wherein the one or more further characteristics of the light footprint comprise a maximum intensity within the light footprint along a line in the light footprint perpendicular to the gradient line, an intensity at a predetermined position within the light footprint along the line in the light footprint perpendicular to the gradient line, and/or a sum of intensities at two or more different predetermined positions within the light footprint along the line in the light footprint perpendicular to the gradient line,
   comparing the one or more determined further characteristics with one or more known further characteristics of a light footprint of light emitted by the light source from a predetermined mounting height to determine a further deviation between the one or more determined further characteristics and the one or more known further characteristics; and
   determining the mounting height of the light source based on the determined further deviation.

5. The method according to claim 1, wherein:
   the position of the light source comprises a mounting height of the light source and a mounting rotation of the light source about one or more axes of rotation,
   the light footprint of light emitted by the light source from the known position is a light footprint of light emitted by the light source from a known height and a known mounting rotation, and
   the one or more characteristics of the light footprint comprise intensities at two or more different predetermined positions within the light footprint.

6. The method according to claim 1, wherein the position of the light source comprises a mounting orientation of the light source and the one or more characteristics of the light footprint comprise one or more characteristics indicative of a shape of the light footprint.

7. The method according to claim 6, wherein the position of the light source further comprises a mounting height of the light source and wherein the method further comprises:
   processing the first image to determine one or more further characteristics of the light footprint within the first image, wherein the one or more further characteristics of the light footprint comprise a maximum intensity within the light footprint, an intensity at a predetermined position within the light footprint, and/or a sum of intensities at two or more different predetermined positions within the light footprint,
   comparing the one or more determined further characteristics with one or more known further characteristics of a light footprint of light emitted by the light source from a predetermined mounting height to determine a further deviation between the one or more determined further characteristics and the one or more known further characteristics; and
   determining the mounting height of the light source based on the determined further deviation.

8. The method according to claim 1, wherein
   the position of the light source comprises a mounting rotation of the light source about a predetermined axis of rotation in a plane parallel to the light footprint of light emitted by the light source,
   the light footprint of light emitted by the light source from the known position is a light footprint of light emitted by the light source from a known mounting rotation of the light source about the predetermined axis of rotation, and the one or more characteristics of the light footprint comprise a location, within the light footprint and along a line perpendicular to a projection of the predetermined axis of rotation onto the light footprint, of at least one extreme point of the light footprint.

9. The method according to claim 1, wherein:
the position of the light source comprises a mounting height of the light source,
the light footprint of light emitted by the light source from the known position is a light footprint of light emitted by the light source from a known height, and
the one or more characteristics of the light footprint comprise one or more characteristics indicative of an area of the light footprint.

10. The method according to claim 1, wherein
the position of the light source comprises a mounting rotation of the light source about a predetermined axis of rotation in a plane parallel to the light footprint of light emitted by the light source and a mounting height of the light source,
the light footprint of light emitted by the light source from the known position is a light footprint of light emitted by the light source from a known mounting rotation of the light source about the predetermined axis of rotation and from a known height, and
the one or more characteristics of the light footprint comprise one or more characteristics indicative of an area of the light footprint and one or more characteristics indicative of a location of the light footprint within the first image.

11. The method according to claim 1, wherein:
the position of the light source comprises a mounting rotation of the light source about an axis of rotation perpendicular to the light footprint of light emitted by the light source,
the light footprint of light emitted by the light source from the known position is a light footprint of light emitted by the light source from a known mounting rotation of the light source about the axis of rotation, and
the one or more characteristics of the light footprint comprise a location of a predetermined gradient in intensity distribution along a predetermined line in the light footprint.

12. The method according to claim 1, wherein:
the position of the light source comprises a mounting rotation of the light source about an axis of rotation perpendicular to the light footprint of light emitted by the light source,
the light footprint of light emitted by the light source from the known position is a light footprint of light emitted by the light source from a known mounting rotation of the light source about the axis of rotation, and
the one or more characteristics of the light footprint comprise one or more characteristics indicative of a gradient in intensity distribution within a predetermined two-dimensional area within the light footprint.

13. The method according to claim 1, further comprising selecting the light footprint of light emitted by the light source from the known position from a plurality of light footprints of light emitted by the light source from a plurality of known positions, the plurality of known positions being different from one another, wherein the selection is made so that the light footprint has the one or more known characteristics closest to the one or more characteristics of the light footprint contained in the first image.

14. A device for determining a position of a light source of a luminaire based on a first image, the first image having been acquired by an optical sensor and containing a light footprint of light emitted by the light source from the position, the position of the light source comprising at least one of a mounting rotation of the light source about a predetermined axis of rotation in a plane parallel to the light footprint of light emitted by the light source or a mounting height of the light source, the device comprising:
an optical sensor for obtaining the first image; and
one or more processors configured for:
processing the first image to determine one or more characteristics of the light footprint within the first image,
comparing the one or more determined characteristics with one or more known characteristics of a light footprint of light emitted by the light source from a known position to determine a deviation between the one or more determined characteristics and the one or more known characteristics, and
determining the position of the light source based on the determined deviation,
wherein:
the optical sensor for obtaining the first image comprises an optical sensor configured to acquire the first image, the first image containing the light footprint of light emitted by the light source from the position.

15. A non-transitory computer-readable medium comprising software code portions configured to, when executed on a processing unit, perform the steps of the method according to claim 1.

* * * * *